United States Patent
Pinnavaia et al.

(10) Patent No.: US 6,800,266 B2
(45) Date of Patent: Oct. 5, 2004

(54) PROCESS FOR THE PREPARATION OF HYBRID MESOPOROUS MOLECULAR SIEVE SILICAS FROM AMINE SURFACTANTS

(75) Inventors: Thomas J. Pinnavaia, East Lansing, MI (US); Thomas R. Pauly, Lansing, MI (US); Seong-Su Kim, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 633 days.

(21) Appl. No.: 09/764,686

(22) Filed: Jan. 18, 2001

(65) Prior Publication Data

US 2002/0051745 A1 May 2, 2002

Related U.S. Application Data

(60) Provisional application No. 60/197,033, filed on Apr. 13, 2000.

(51) Int. Cl.[7] ............................................. C01B 33/26
(52) U.S. Cl. ...................................... 423/328.1; 502/63
(58) Field of Search ................................ 423/326, 335, 423/328.1, 331, 700; 502/63, 64

(56) References Cited

U.S. PATENT DOCUMENTS

| | | | |
|---|---|---|---|
| 5,143,879 A | 9/1992 | Whitehurst | |
| 5,270,273 A | * 12/1993 | Pelrine et al. | 502/60 |
| 5,370,785 A | * 12/1994 | Beck et al. | 208/46 |
| 5,622,684 A | 4/1997 | Pinnavaia | |
| 5,672,556 A | 9/1997 | Pinnavaia | |
| 5,712,402 A | 1/1998 | Pinnavaia | |
| 5,750,085 A | * 5/1998 | Yamada et al. | 423/328.2 |
| 5,785,946 A | 7/1998 | Pinnavaia | |
| 5,795,559 A | 8/1998 | Pinnavaia | |
| 5,800,799 A | 9/1998 | Pinnavaia | |
| 5,800,800 A | 9/1998 | Pinnavaia | |
| 5,840,264 A | 11/1998 | Pinnavaia | |
| 5,855,864 A | 1/1999 | Pinnavaia | |
| 6,027,706 A | 2/2000 | Pinnavaia | |
| 6,592,764 B1 | * 7/2003 | Stucky et al. | 210/660 |

OTHER PUBLICATIONS

Beck, J.S., et al J. Am. Chem. Soc. 114 10834 (1992), no month.
Huo, Q., et al., Chem. Mater. 6 1176 (1994) no month.
Huo, Q., et al., Nature 368 317 (1994), no month.
Tanev, P.T., et al., Science 267 865 (1994), no month.
Antonelli, D.M., et al., Angew. Chem. Int. Ed. Engl., 35 426 (1996), no month.
Antonelli, D.M., et al., Chem. mater 8 874 (1996), no month.
Tanev, P.T., et al., Chem. Mater 8 2068 (1996), no month.
Behrens, P., Angew. Chem. Int. Ed. Engl. 35(5) 515 (1996), no month.
Pauly, T.R., et al., J. Am. Chem. Soc. 121 8835 (1999), no month.
Bagshaw, S.A., et al., Science 269 1242 (1994), no month.
Bagshaw, S.A., et al., Angew. Chem. Int. Ed. Engl. 35 1102 (1996), no month.
Prouzet, E., et al., Angew. Chem. Int. Ed. Engl. 36 516 (1997), no month.
Sierra, L., et al., Adv. Mater 11(4) 307 (1999), no month.
Sierra, L., et al., Microporous and Mesoporous Materials 27 243 (1999), no month.
Cassiers et al., Royal Society of Chemistry 2489–2490 (2000), no month.
Sing, K.S.W., et al., Pure Appl. Chem. 57 603 (1985), no month.
Horvath, G., et al., J. Chem. Eng. Jpn. 16 470 (1983), no month.

* cited by examiner

Primary Examiner—Stanley S. Silverman
Assistant Examiner—Edward M. Johnson
(74) Attorney, Agent, or Firm—Ian C. McLeod

(57) ABSTRACT

Hybrid mesoporous molecular sieve silica compositions which have intergrown wormhole domains and lamellar or hexagonal domains and prepared from mixtures of water soluble silicate precursors and amine surfactant templates through a neutralization reaction are described. The silica compositions are stable above 600° C.

52 Claims, 8 Drawing Sheets

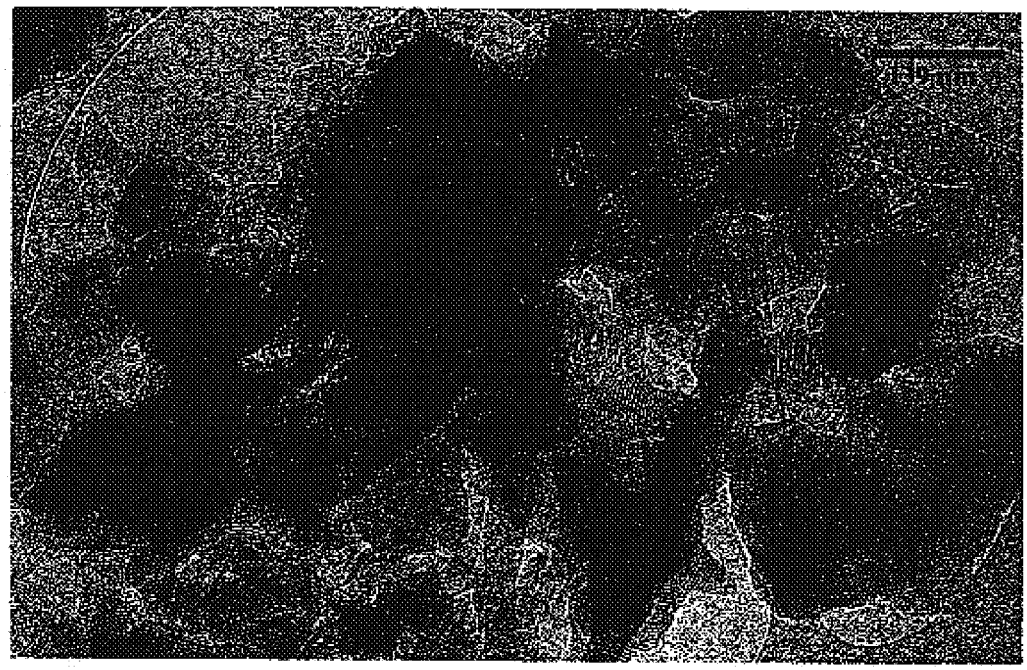
FIG. 8A
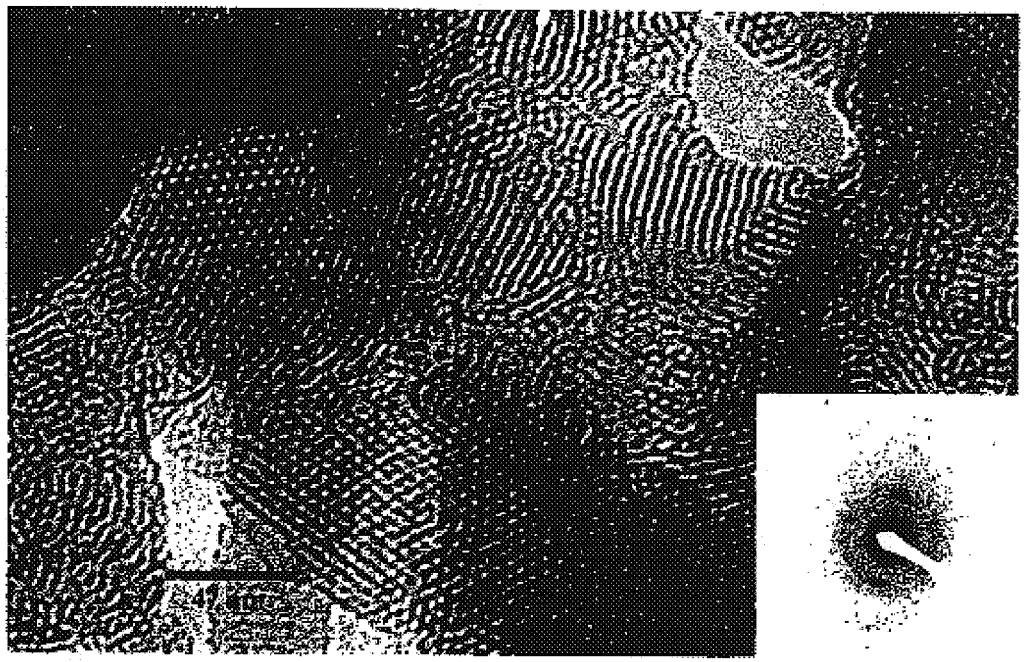
FIG. 8B
FIG. 8C

PROCESS FOR THE PREPARATION OF HYBRID MESOPOROUS MOLECULAR SIEVE SILICAS FROM AMINE SURFACTANTS

CROSS-REFERENCE TO RELATED APPLICATIONS

The present application relies for priority on application Ser. No. 60/197,033, filed Apr. 13, 2000.

STATEMENT REGARDING FEDERALLY SPONSORED RESEARCH OR DEVELOPMENT

This invention was sponsored by NSF grant CHE 96-33798 and 99-03706. The government has certain rights in this invention.

BACKGROUND OF THE INVENTION (1) Field of the Invention

The present invention relates to thermally stable hybrid molecular sieve silicas generally having uniform pores, and specifically to calcined silicas. The silicas have hybrid wormhole and either lamellar or hexagonal structures intergrown together. In particular, the present invention relates to the use of water soluble silicates and preferably neutral amine surfactants surfactants for the preparation of these thermally stable silicas. In particular the present invention relates to mesoporous silicas having a pore size between about 1.0 and 12 nm.

(2) Description of Related Art

The disclosure by Mobil in 1992 (Beck, J. S., et al., J. Am. Chem. Soc. 114 10834 (1992)) of the synthesis of mesoporous aluminosilicate molecular sieves (M41S materials) utilizing assemblies of cationic organic molecules (micelles) as structure directors led to a vast amount of research into this field. To date, the synthesis of mesoporous molecular sieves can be classified into several general pathways according to their organic-inorganic interfacial interactions. Electrostatic charge matching (Beck, J. S., et al., J. Am. Chem. Soc. 114 10834 (1992); Huo, Q., et al., Chem. Mater. 6 1176 (1994); Huo, Q., et al., Nature 368 317 (1994)), H-bonding (Tanev, P. T., et al., Science 267 865 (1994); and Bagshaw, S. A., et al., Angwen. Chem. Int. Ed. Engl. 36 516 (1997)), and dative bonding interactions (Antonelli, D. M., et al., Angwen. Chem. Int. Ed. Engl., 35 426 (1996); and Antonelli, D. M., et al., Chem. Mater 8 874 (1996)) at the organic micelle-inorganic interface have all been successfully utilized in the formation of mesostructured inorganic materials.

Electrostatic charge matching pathways utilize coulombic interactions between the charged structure directing surfactant assemblies (micelles) and ionic silica species in the assembly of stable inorganic framework structures. As reported by Mobil, synthesis of the M41S family of molecular sieves relies on cooperative assembly between cationic quaternary ammonium surfactant micelles ($S^+$) and anionic water-soluble silicates ($I^-$). Synthesis under hydrothermal conditions results in mesoporous silicates that possess a high degree of framework pore order. M41S materials are generally large particle materials that have uniform pore diameters, significantly large surface areas (~800–1200 $m^2/g$) and little to no observable textural mesoporosity (Tanev, P. T., et al., Chem. Mater. 8 2068 (1996)). Due to the strong coulombic interactions between the surfactant and the silica wall, however, a simple solvent extraction and recycling of this costly quaternary ammonium surfactant is not possible. Surfactant removal is accomplished either by calcinations or by an ion exchange-solvent extraction method (Whitehurst, D. D. U.S. Pat. No. 6,143,879 (1992)).

The syntheses of HMS materials rely on H-bonding interactions between the neutral amine surfactant ($S^o$) assemblies and molecular silica precursors ($I^o$) such as tetraethylorthosilica (TEOS) (Tanev, P. T., et al., Science 267 865 (1995)). This H-bonding interaction is significantly weaker than the coulombic interactions of the electrostatic pathways resulting in the disordered wormhole pore structure typical of HMS silicas (Tanev, P. T., et al., Science 267 865 (1995); Tanev, P. T., et al., Chem. Mater. 8 2068 (1996); and Behrens, P., Angew. Chem. Int. Ed. Engl. 35(5) 515 (1996)). This wormhole pore structure has significant pore branching and 3-dimensional pore character. Characteristic properties of HMS silicas, however, are similar to those of electrostatically assembled mesostructures in their pore size distributions, surface areas, and pore volumes. Additionally, synthesis of these silicas in highly polar solvents, where the surfactant exists in an emulsion phase, results in small particle materials that possess significant textural, or interparticle, porosity (Pauly, T. R., et al., J. Am. Chem. Soc. 121 8835 (1999)). This fact along with the highly branched pore structure yields a mesoporous material that exhibits unique catalytic activity due to the enhanced access to reactive sites (Pauly, T. R., et al., J. Am. Chem. Soc. 121 8835 (1999)).

Long alkyl chain amine surfactants used in HMS synthesis are significantly less costly than quaternary ammonium salts used in the synthesis of M41S and SBA materials. The use of TEOS or other molecular silica species, however, is considerably more expensive than available water soluble silicate species. Thus far, however, mesostructure synthesis using H-bonding mechanisms with neutral amine surfactants required the use of molecular silica species.

Mesoporous molecular sieve silicas with wormhole framework structures (e.g., MSU-X (Bagshaw, S. A., et al., Science 269 1242 (1994); Bagshaw, S. A., et al., Angwen. Chem. Int. Ed. Engl. 35 1102 (1996); Prouzet, E. et al., Angwen. Chem. Int. Ed. Engl. 36 516 (1997), and HMS (Tanev, P. t., et al., Science 267 865 (1995)) are generally more active heterogeneous catalysts in comparison to their ordered hexagonal analogs (e.g., MCM-41 (Beck, J. S., et al., J. Am. Chem. Soc. 114 10834 (1992); and Huo, Q., et al., Nature 368 317 (1994)), and SBA-15 (Stucky, JACS). The enhanced reactivity has been attributed, in part, to a pore network that is connected in three dimensions, allowing the guest molecules to more readily access reactive centers that have been designed into the framework surfaces (Tanev, P. T., et al., Chem. Mater. 8 2068 (1996); Whitehurst, D. D. U.S. Pat. No. 6,143,879 (1992); Behrens, P. Angwen. Chem. Int. Ed. Engl. 35(5), 515 (1996); and Pauly, T. R., et al., J. Am. Chem. Soc. 121 8835 (1999)). All of the wormhole framework structures reported to date have been prepared through supramolecular $S^oI^o$ (Tanev, P. T., et al., Science 267 865 (1995) and $N^oI^o$ (Bagshaw, S. A., et al., Angwen. Chem. Int. Ed. Engl. 35 1102 (1996); Prouzet, E., et al., Angwen. Chem. Int. Ed. Engl. 36 516 (1997)) assembly pathways wherein $I^o$ is an electrically neutral silica precursor (typically, tetraethylorthosilicate, TEOS), $S^o$ is a neutral amine surfactant, and $N^o$ is a neutral di- or tri-block surfactant containing polar polyethylene oxide (PEO) segments. One disadvantage of these pathways, as with other assembly pathways based on TEOS, is the high cost of the hydrolyzable silicon alkoxide precursor. Greater use of wormhole framework structures as heterogeneous catalysts can be anticipated if a more efficient approach to either $S^oI^o$ or $N^oI^o$ assembly is devised based on the use of low cost soluble silicate precursors, without sacrificing the intrinsically desirable processing advantages of these pathways (e.g., facile removal and recycling of the surfactant).

Recently, Guth and co-workers reported the preparation of disordered silica mesostructures by precipitation from sodium silicate solutions over a broad range of pH in the presence of TRITON-X 100, an N° surfactant (Sierra, L., et al., Adv. Mater 11(4) 307 (1999); and Sierra, L., et al., Microporous and Mesoporous Materials 27 243 (1999)). The retention of a mesostructure was observed up to a calcination temperature of 480° C., but the complete removal of the surfactant at 600° C. led either to the extensive restructuring of the silica framework, as indicated by the loss of mesoporosity or the formation of a completely amorphous material. In contrast wormhole MSU-X and HMS mesostructures are structurally stable to calcination temperatures in excess of 800° C.

Of interest is the use of an aqueous acid solution to extract an amine surfactant template from the as-formed mesoporous silica composition. This is reported by *Cassiers* et al., Royal Society of Chemistry 2489–2490 (2000).

U.S. Pat. Nos. 5,800,799, 6,027,706, 5,622,684, 5,795,559, 5,855,864, 5,672,556, 5,840,264, 5,800,800, 5,785,946, and 5,712,402, are generally related to the present invention.

Objects

There is a need for mesoporous silica compositions with improved properties. There is also a need for mesostructured silica compositions which are economical to prepare. These and other objects will become increasingly apparent by reference to the following description and the drawings.

SUMMARY OF THE INVENTION

The present invention relates to hybrid mesoporous silica compositions in which the framework pore structure is defined by the intergrowth of nano-domains of both wormhole framework pore structures and either lamellar or hexagonal framework pore structures. Typically, the nano-domains are of 100 nm or less in diameter and do not possess a distinct boundary between adjacent domains.

The present invention relates to a hybrid molecular sieve silica composition comprising a framework structure defining the mesopores which is in one domain lamellar or hexagonal and in another domain with wormhole pores and wherein the domains are intergrown together. Typically the domain sizes are 100 nm or less.

The present invention also relates to a composition which is a hybrid wormhole and lamellar or hexagonal framework molecular sieve silica prepared by a neutralizing reaction in an aqueous solution of amine surfactant; a reactive silica species of pH balance 5 and 10.5; aging of the solution to precipitate the silica and removing of the silica from the solution.

The present invention particularly relates to a composition which is a hybrid wormhole and lamellar or hexagonal molecular sieve silica prepared by a process which comprises:
(a) acidifying an aqueous solution of an amine surfactant, preferably containing 6 to 36 carbon atoms, as a structure director with an acid selected from the group consisting of organic, mineral and oxy acids;
(b) preparing a reactive silica species in the aqueous solution by neutralization of a basic soluble silicate solution by mixing with the acidified amine surfactant aqueous solution of step (a) reaching a final pH of about 5 to 10.5;
(c) aging the reactive silica species from step (b), preferably for no less than 5 minutes, at a temperature greater than −20° C. in anhydrous form. The silica has the formula:

(c) aging the reactive silica species from step (b), preferably for no less than 5 minutes, at a temperature greater than −20° C. in anhydrous form. The silica has the formula:

$$SiM_wO_{2+x}$$

wherein $1.0 \geq w \geq 0$ and $1.5 \geq x \geq 0$ and wherein M when present is one or more metal ions.
wherein $1.0 \geq w \geq 0$ and $1.5 \geq x \geq 0$ and wherein M when present is one or more metal ions.
(d) recovering a solid product from the aqueous solution by removal of the solution; and
(e) removing the surfactant from the solid by calcination at 600° C. in air for not less than 30 minutes, by solvent extraction, or by treatment with a stoichiometric amount of aqueous acid solution and washing with water, to produce the molecular sieve silica, wherein silica possesses framework-confined mesopores with pore diameters ranging from 1.0 to 12.0 nm, the framework-confined channel structure comprises a hybrid wormhole and lamellar or hexagonal framework morphology has at least one resolved powder x-ray reflection corresponding to a pore-pore correlation spacing of 1.5 to 15.0 nm, inorganic oxide wall thickness of greater than 0.5 nm, specific surface areas of 400 to 1400 m²/g and framework pore volumes of 0.2 to 2.0 cc/g $N_2$, preferably with textural pore volumes of 0.01 to 3 cc/g $N_2$.

The present invention further relates to a composition which is a hybrid molecular sieve silica prepared by a process that comprises:
(a) preparing an aqueous solution of a amine surfactant as an organic structure director;
(b) adding a basic soluble silicate to the amine solution;
(c) neutralizing the basic amine and silicate solution with an acid selected from the group consisting of organic, mineral and oxy acids to a final pH of about 5.0 to 10.5 to provide a reactive silica;
(d) aging reactive silica from step (b) at temperatures greater than −20° C.;
(e) recovering a solid product from the aqueous solution; and
(f) removing the surfactant by removal of the solution to provide the molecular sieve silica, wherein the silica possesses framework-confined mesopores with pore diameters ranging from 1.0 to 12.0 nm, the framework-confined channel structure comprises the hybrid, a wormhole and lamellar or wormhole framework morphology, has one resolved powder X-ray reflection corresponding to a pore-pore correlation spacing of 1.5 to 15.0 nm, inorganic oxide wall thickness of greater than 0.5 nm, specific surface areas of 400 to 1400 m²/g and framework pore volumes of 0.2 to 3.0 cc/g $N_2$, and preferably textural pore volumes of 0.01 to 3 cc/g $N_2$.

The present invention further relates to a composition which is a hybrid molecular sieve silica prepared by a process which comprises:
(a) acidifying an aqueous solution of an amine surfactant containing an alkyl chain with 6 to 36 carbon atoms as the organic structure director with an acid selected from the group consisting of organic, mineral and oxy acids;

(b) preparing a reactive silica species by addition of a soluble silicate to the acidified amine surfactant reaching a pH of less than 4;

(c) titrating the reactive silica with a base to a final pH of about 5.0 to 10.5;

(d) aging reactive silica from step (b) at temperatures greater than −20° C.;

(e) recovering a solid product from the aqueous solution; and (f) removing the surfactant from the solid product to provide the molecular sieve silica, wherein the resulting inorganic oxide possesses framework-confined mesopores with pore diameters ranging from 10 to 12.0 nm, the framework-confined channel structure comprises the hybrid of a wormhole and lamellar or hexagonal framework morphology, has at least one resolved powder x-ray reflection corresponding to a pore-pore correlation spacing of 1.5 to 15.0 nm, inorganic oxide wall thickness of greater than 0.5 nm, specific surface areas of 400 to 1400 m$^2$/g and framework pore volumes of 0.2 to 2.0 cc/g N$_2$, and textural pore volumes of 0.01 to 3 cc/g N$_2$.

The present invention relates to a process for the preparation of a hybrid wormhole and lamellar or hexagonal molecular sieve silica which comprises:

(a) reacting in an aqueous solution, an amine surfactant and a reactive silica species of pH between 5 and 10.5;

(b) aging the solution to precipitate the silica; and (c) removing the silica from the solution.

The present invention further relates to a process for the preparation of a hybrid molecular sieve silica which comprises:

(a) providing a protonated amine surfactant solution with a pH below 7.0;

(b) reacting the protonated amine surfactant solution with a mixture of a base and a soluble silicate solution to produce a reactive silica species at a final pH between about 5 and 10.5;

(c) aging the reactive silica species in the solution of step (b) at a temperature greater than −20° C. to form a precipitated product which is the silica in the solution; and (d) recovering the precipitated product from the solution.

The present invention further relates to a process for the preparation of a hybrid molecular sieve silica which comprises:

(a) acidifying a surfactant solution of a neutral amine surfactant with an acid thereof to produce a pH below 7.0;

(b) forming a reactive silica species by neutralization of a soluble silicate solution with the surfactant solution of step (a) to provide a final pH of about 5.0 to 10.5;

(c) aging the reactive silica species in the solution of step (b) at a temperature greater than −20° C. to form a precipitated product which is the silica in the solution; and (d) recovering the precipitated product from the solution.

The present invention further relates to a process for the preparation of a hybrid molecular sieve silica which comprises:

(a) providing an aqueous solution of a water soluble silicate at a pH greater than 9;

(b) combining the aqueous solution with a neutral amine surfactant and an acid to produce a resulting mixture wherein the pH of the mixture is between about 5.0 and 10.5;

(c) aging the resulting mixture at a temperature between −20° and 100° C. until the hybrid molecular sieve silica is formed; and (d) removing at least the aqueous solution to produce the hybrid molecular sieve silica.

The present invention further relates to a process for the preparation of a hybrid molecular sieve aluminosilicate which comprises:

(a) providing an aqueous solution of a water soluble aluminate and silicate in a molar ratio of aluminate to silicate of between about 0.01 and 1.0 at a pH greater than 9;

(b) combining the aqueous solution with neutral amine surfactant and an acid in aqueous solution to produce a resulting mixture wherein the pH of the mixture to be between about 5.0 and 10.5;

(c) aging the resulting mixture at a temperature between −20° and 100° C. until the hybrid molecular sieve aluminosilicate is formed; and (d) removing at least the aqueous solution to produce the hybrid molecular sieve aluminosilicate.

Further the present invention relates to a process for the preparation of a hybrid molecular sieve alumino-silicate which comprises:

(a) providing an aqueous solution of a water soluble silicate at a pH greater than 9;

(b) combining the aqueous solution with a neutral amine surfactant, an aluminum salt and an acid in aqueous solution to produce a resulting mixture wherein the aluminum to silicon molar ratio is between 0.01 and 1.0 and the pH of the mixture to be between about 5.0 and 10.5;

(c) aging the resulting mixture at a temperature between −20° and 100° C. until the hybrid molecular sieve aluminosilicate is formed; and (d) removing at least the aqueous solution to produce the hybrid molecular sieve aluminosilicate.

BRIEF DESCRIPTION OF THE DRAWINGS

FIGS. 8A and 8B are TEM micrographs and selected area electron diffraction pattern (SAED) pattern of the calcined product of Example 15.

FIG. 8C is a selected area electron diffraction pattern (SAED).

DESCRIPTION OF PREFERRED EMBODIMENTS

Figure 1:
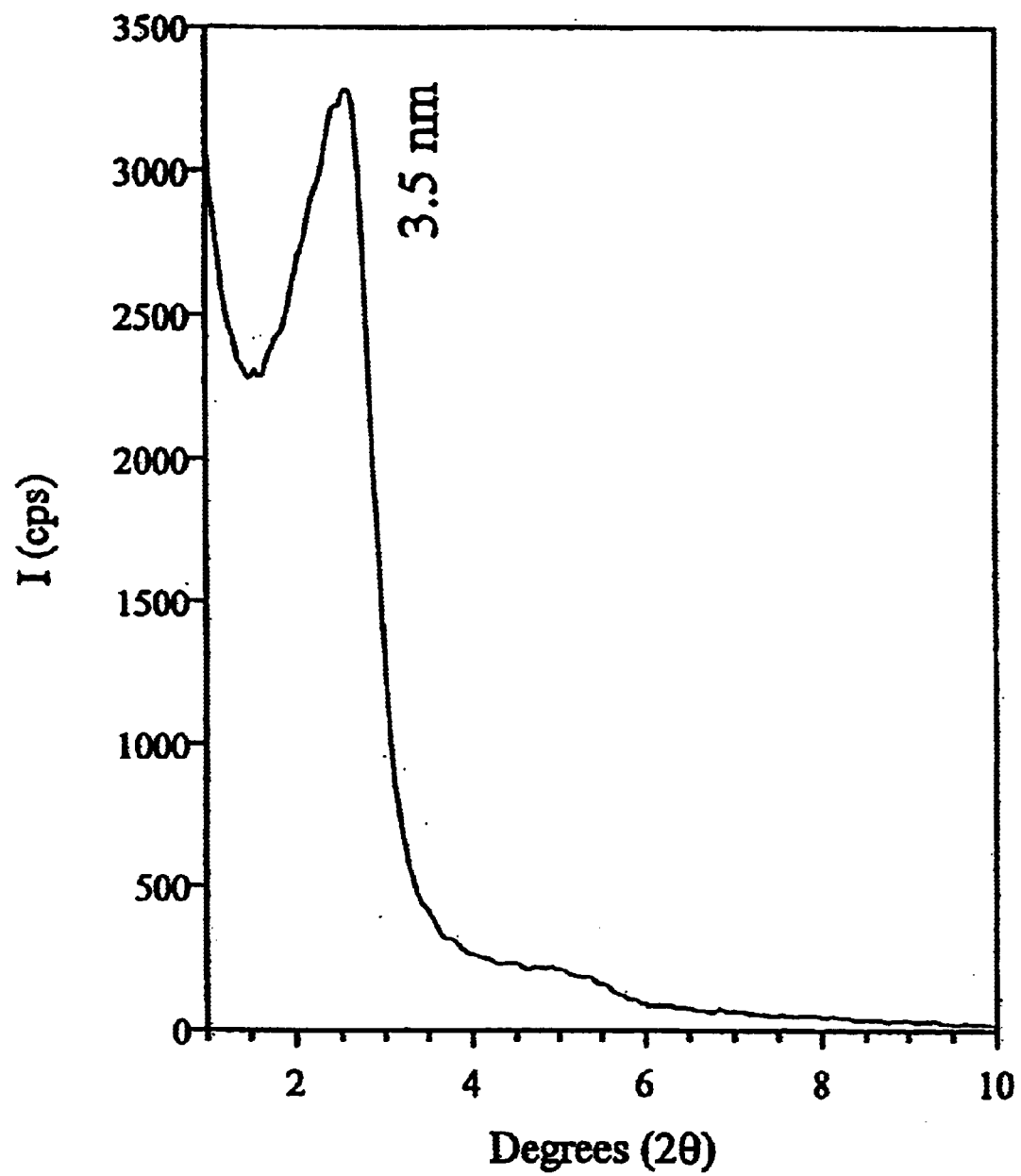
FIG. 1 is an X-ray powder diffraction pattern of the calcined product of Example 1.

A particular objective of this invention is to provide for new classes of mesoporous silica compositions with hybrid framework structures. In one embodiment of the invention, the mesoporous framework combines the structural characteristics of a wormhole framework with those of a lamellar framework. In another embodiment, the framework structure integrates a wormhole framework with the structural characteristics of a hexagonal framework. These hybrid structures cannot be described as simple physical mixtures of wormhole and lamellar or wormhole and hexagonal structures. Instead, the hybrid compositions of this invention are intergrowths of mesoscopic domains that are structurally best described as wormhole frameworks intergrown with either lamellar or hexagonal frameworks through intergrowth of domains. Thus, a physical separation of the intergrown domains is not possible. Another objective of this invention is to provide a cost-efficient process for forming the said hybrid structures using soluble silicates as the silica precursors and amine surfactants as the structure-directing agents. One particularly preferred silica precursor is the silica-sodium hydroxide solution generally known as "water glass". Other silica sources such as fumed silica can also be used in place of soluble silicate salts, but the soluble silicates are preferred in view of their low cost. The synthesis of the hybrid structure are carried out under conditions of pH (between 5.0 and 10.5) where the amine surfactant exists in solution primarily in the electronically neutral form. To achieve the desired pH conditions, it is necessary to add an amount of acid to the basic soluble silicate precursor solution in order to neutralize most, if not all, of the hydroxide ions that are initially present in the starting soluble silicate solution. The acid used to neutralize hydroxide ions in the silicate precursor solution can be either an organic acid, a mineral acid or an oxyacid. The control of pH in the range 5.0 to 10.5, more preferably in the range 6.5 to 8.5, allows the amine surfactant and silica precursor to exist primarily in electrically neutral form to allow for H-bonding interactions at the surfactant-silica interface.

In particular the process uses:
(a) increased temperatures to increase pore size and (b) increased temperatures to increase framework cross-linking and dehydroxylation of the pore surface. Control of particle size and morphology also is achieved by adjustment of these synthesis conditions. The compositions of the present invention contain:

Variable alkali (metal) ions or quaternary ammonium ions in the final product. These ions originate from the counter-cations of the soluble silicate precursors.

Variable amine surfactant to $SiO_2$ ratios (0.10 to 1.0). Uniform framework pore sizes and correlated pore spacings leading to unique disordered wormhole hybrid structures intergrown with lamellar or hexagonal framework structures over domains of mesoscopic size.

Framework pore diameters from 1.0 to 12.0 nm formed from amine templated solutions. Short-range lamellar and hexagonal pore order intergrown with wormhole frameworks obtained through judicious choices of amine surfactant, synthesis pH, reaction stoichiometry and reaction temperature.

Divalent and Trivalent hetero-atom substitution (Ba, Cr, Ni, Zn, Co, Cu, Al, B, Ga, Fe, etc.) in a mesostructured silica framework.

Tetravalent hetero-atom substitution (Ge, Ti, V, Sb, Zr, Sn, etc.) in a mesostructured silica framework.

Penta- or Hexavalent hetero-atom substitution (P, V, W, Mo, etc.) in a mesostructured silica framework. The compositions of the present invention are generally referred to as "hybrid molecular sieve silicas", or simply "silicas" or occasionally "silicates". In using such terms the meaning is mesostructured oxide compositions in which at least 50% of the oxide on a mole basis is silica ($SiO_2$) when written in anhydrous form. The remaining portion of the framework composition may be other metal oxides or even organosilyl groups that are integrated into the framework structure through covalent bond formation. Exchange cations that balance the framework charge and guest molecules, such as water, that occupy the framework pores are not considered to be part of the framework composition within the scope of this definition. The framework may be negatively charged, particularly when the framework contains aluminum and other metal ions co-condensed with $SiO_4$ units in the framework. In this case protons, alkali metal, transition metal or organic cations can be introduced in the framework pores or be electrostatically linked to the framework walls to balance the framework charge.

Further, the compositions of the present invention exhibit at least one x-ray reflection corresponding to a d-spacing $\geq 3.0$ nm. Still further, TEM (transmission electron microscopy) images reveal a framework structure that integrates the structural characteristics of a wormhole framework with the structural characteristics of either a lamellar framework or a hexagonal framework through intergrowth of mesoscopic domains of said structures.

The term "surfactant" means a surface active molecule with one polar water soluble end and a non-polar oil soluble end, thus enabling the molecule to reduce the surface tension of water.

The term "neutral amine surfactant" means a composition which is a surface active agent initially absent of any formal charge which acts as a template or structure director. The template is provided with a proton from an acid during acidification to form an onium ion in a first aqueous solution which is neutralized in the process by the basic silica species in a second aqueous solution. Particularly included are the neutral amine surfactants. The template is in one preferred embodiment a neutral primary, secondary, tertiary or polyamine or mixtures thereof, preferably having at least one alkyl chain of from 6 to 36 carbon atoms or mixtures thereof. The amines can also be aliphatic or aromatic amines. The amine or polyamine surfactant may be initially protonated but upon reaction with basic solutions of the preferred soluble silicate precursors the protons are neutralized by reaction with the basic component of the silicate source, thus generating a predominately neutral amine or polyamine as the structure-directing surfactant.

The neutral amine surfactant preferably has the structural formula:

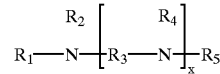

$R_1$ is a hydrophobic group preferably containing 6 to 36 carbon atoms;

$R_2$, $R_4$, $R_5$ are alkyl or aryl groups or hydrogen;

$R_3$ is an organic linker group containing one to six carbon atoms; and x is 0 to 6. Synthesis of polyamine surfactants comprises reacting tallow (animal) fatty acids with ammonia ($NH_3$) at high temperatures followed by the subsequent reduction of the resultant nitrile with $H_2$ over a ReNi catalyst at high pressures. Continued reaction of the reduced amine with acrylonitrile ($CH_2CHCN$), followed by subsequent reduction with $H_2$, results in polyamine whose amine content and number of amine repeat units is dependent on the number of continued alkylations of the amine with acrylonitrile.

Those skilled in the art will recognize that any amine or protonated onium surfactants capable of bonding to inorganic precursors through complexation or through hydrogen bonds to Si—OH or Si—O linkages can be suitable surfactants. Polyamine based surfactants have the advantage of low cost.

The term "soluble silicate solution" means a basic solution of an alkali metal or organic quaternary ammonium ion silicate. The soluble silica solution is prepared with addition of an alkali, or organic base to dissolve silica at a high pH greater than 12. Preferably the solution has a $SiO_2/M_2O$ ratio of between about 1.5 and 4.0, where M is an alkali metal ion or an organic quaternary ammonium ion.

The aluminum salts are aluminum nitrate, aluminum chloride, aluminum sulfate and a cationic aluminum oligomer.

The reaction mixture can include an organo silane selected from the group consisting of $X_3SiR_1$, $X_2SiR_2$, or $XSiR_3$ and mixtures thereof. X is a hydrolyzable moiety (e.g. alkoxide or halide), which reacts with the hydroxylated silica.

The acid used in the neutralization of the reaction mixture can be either an inorganic or organic acid. Generally this includes organic acids, mineral acids and oxyacids. Inorganic acids are $HNO_3$, HCl, $H_2SO_4$ and the like. Specific organic acids are acetic, glycolic, formic and citric acids, although other acids with similar properties are suitable.

The acid is selected from the group consisting of:

HX where X=Cl, Br, I;

$H_xY$ where $Y=NO_3^-$, $SO_4^{-2}$, $PO_4^{-3}$, $CO_3^{-2}$ and x equals the charge on Y; and HZ, where Z=an organic carboxylate, phenolate, citrate, glycolate.

The hydroxylated silica composition of the present invention preferably has the formula:

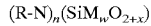

wherein $[SiM_wO_{2+x}]$ is written in anhydrous form without water, wherein R-N is at least one of a selection of neutral aliphatic amines or polyamine surfactants wherein when R-N is present, n is between about 0.05 and 2; wherein when M is present at least one element selected from the group comprising P, Ba, Y, La, Ce, Sn, Ti, Cr, Nb, Fe, V, Ga, Al, Zn, Co, Ni, Mo and Cu and w and 2+x are the molar stoichiometries of M and "O", respectively, wherein w is 0.00 to 0.30; x is 0.00 to 1.50.

After removal of the structure-directing RN amine surfactant by calcination, solvent extraction, or treatment with a stoichiometric amount of acid, the compositions of the present invention also are described in anhydrous form as $SiM_wO_{2+x}$ wherein w and x are as above. They may be used as adsorbents, molecular sieves, catalysts and catalyst supports. When the calcined framework appropriately contains M, one or more functional metallic, non-metallic or metalloid elements, or subsequently impregnated as taught in Ger. Pat. (DD) No. 286,522, with the correct amount of a catalytically active element, selected from the group comprising Sn, Al, Ga, Al, Rh, Nb, Re, Ag, Cu, Cr, Pt, Pd, Ti, V, Zr, Zn, Co, Mo, Ni, Cu or mixtures thereof, or when intercalated with transition metal inorganic metallocycles, it can be used as a catalyst component for cracking, hydrocracking, hydrogenation-dehydrogenation, isomerization, alkylation or oxidations involving large and small organic substrates. Preferably the molar ratio of deposited metal to silica is between 0.005 and 0.20 to 1. The compositions of this invention are also useful as adsorbents for molecular separations and chromatography.

The composition with exchange counter ions is defined in anhydrous form by the formula:

where E is one or more exchange ions, q is the weighted molar average valence of E; n/q is moles of E per mole of Si, n is the charge on the composition excluding E, and w and x, respectively, are the molar compositions of M and oxygen in the framework.

The synthetic process toward the new compositions of this invention involve the preparation of solutions or emulsions of a structure-directing surfactant and co-surfactant compound and reaction of this solution with the inorganic silica precursor under stirring, sonication, shaking, or quiescent conditions until formation of the desired product is achieved and recovered as the mesoporous silica product.

The assembled mesostructured silicas of the present invention can be combined with other components, for example, zeolites, clays, inorganic oxides, carbon, graphite, or organic polymers or mixtures thereof. In this way adsorbents, ion-exchangers, catalysts, catalyst supports or composite materials with a wide variety of properties can be prepared. Additionally, one skilled in the art can impregnate or encapsulate transition metal macrocylic molecules such a porphyrins or phthalocyanines containing a wide variety of catalytically active metal centers.

Additionally, the surfaces of the compositions can be chemically functionalized in order to produce catalytic, hydrophilic or hydrophobic surfaces. The surfaces may be functionalized by directly incorporating the functionalizing agent into the mesostructure assembly process or after synthesis of the mesostructure by reaction with various metal salts, organometallic reagents, silylation reagents, or alkylating reagents.

Wide-angle powder x-ray diffraction (XRD) patterns are obtained using a Rigaku Rotaflex Diffractometer with Cu Kα radiation (λ=0.154 nm). Counts were accumulated every 0.02 degrees (2θ) at a scan speed of 1 degree (2θ)/min. X-ray scattering provides structural data on the spatial arrangement of mesoporous channels within the porous oxide on one length scale, and the atomic ordering of the oxide itself on a smaller length scale. Periodically ordered channels within an oxide and/or the crystalline oxide itself, will provide Bragg scattering indicative of the corresponding symmetry. Coherent X-ray scattering from disordered channel structures, however, results in correlation peaks whose scattering intensity versus angle is dependent on the average pore to pore distance and the uniformity of the pore separation distance within the oxide. Differences in the positions of the correlation peak for disordered pore systems indicate changes in the average pore-pore separation.

$N_2$ adsorption-desorption isotherms are obtained at −196° C. on a Micromeritics ASAP 2010 Sorptometer (Norcross, Ga.) using static adsorption procedures in order to characterize the pore structure. Samples were out gassed at 150° C. and $10^{-6}$ Torr for a minimum of 12 hours prior to analysis. BET surface areas were calculated from the linear part of the BET plot according to IUPAC (Sing, K. S. W., et al., Pure Appl. Chem. 57 603 (1985)) recommendations. Pore size distribution was estimated from the adsorption branch of the isotherm by the method of Horvath and Kawazoe (Horvath, G., et al., J. Chem. Eng. Jpn. 16 470 (1983)). The framework pore volume ($V_f$) for each mesostructured sample is taken as the volume adsorbed at the completion of capillary condensation within the framework pores (mid-P/Po $N_2$ uptake), whereas the total pore volume ($V_t$) is the volume adsorbed at 0.99 P/Po. The textural pore volume ($V_{tx}$) is the difference ($V_t$–$V_f$). Pore wall thickness for disordered pore oxides is determined by subtracting the Horvath-Kawazoe (HK) pore size from the pore-pore correlation distance determined from x-ray scattering. Pore wall thickness for periodically ordered pore oxides is determined by subtracting the Horvath-Kawazoe (HK) pore size from the unit cell parameter, $a_o$, determined from x-ray scattering.

TEM images were obtained on a JEOL JEM-100CX™ II electron microscope (JEOL, USA, Peabody, Mass.) with a $CeB_6$ filament on accelerating voltage of 120 KV, a beam size of approx. 5 μm and objective lens aperture of 20 μm. Samples were prepared by sonicating the powdered sample for 20 minutes in ETOH, and then evaporating 2 drops onto carbon coated copper grids. The electron diffraction patterns were recorded by using an acceleration voltage of 120 kV, a beam size of approx. 5 μm, and a diffraction aperture of 20 μm.

The thermogravimetric analyses (TGA) of all samples were performed on a CAHN system TG analyzer using heating rate of 5° C./min to a maximum value of 1000° C.

$^{29}$Si MAS NMR spectrums were recorded on a Varian VXR-400™ (Palo alto, Calif.) solid-state NMR Spectrometer at 79.5 MHz under single pulse mode with a 7-mm Zirconia rotor, a spinning frequency of 4 kHz, pulse width of 8.5 μs and a pulse delay of 800 seconds. The chemical shifts were externally referenced to Talc (–98.1 ppm).

$^{27}$Al MAS NMR spectra were obtained using a VARIAN VXR-400™ (Palo Alto, Calif.) NMR spectrometer equipped with a VARIAN MAS probe and Zirconia rotor. The spectrometer frequency was 104.22 Mhz pulse width 2 ms, pulse delay of 1 s, and sample spinning rate 4000 Hz.

Alumina-substituted and other metal-substituted derivatives of the mesoporous silicas of the invention are preferably made by (a) direct assembly, or (b) post-synthesis treatment of a mesoporous silica with an aluminum or other metal ion reagent. Organo-functionalized derivatives of silicas can be prepared directly or by post-synthesis treatment of the silica with organosilane reagents.

In a typical synthesis of the silica compositions of this invention, the surfactant and an amount of acid equivalent to the hydroxide content of the basic silicate solution (e.g., 27% $SiO_2$, 14% NaOH) are mixed at ambient temperature and then added to the basic silicate to form a reactive silica in the presence of the structure directing surfactant. This allows for the assembly of the framework under slightly alkaline pH conditions. The assembly process continues at the desired temperature for a period of 10 to 20 hours. The surfactant is then removed from the washed and air-dried products either by solvent extraction with hot ethanol acid extraction or by calcination in air at 600° C.

Materials List

Silica sources:

| Aldrich (Milwaukee, WI) | Sodium Silicate, 27% $SiO_2$, 14% NaOH from Aldrich. |
| | Ludox Colloidal, Ludox HS-40, 39.5% $SiO_2$, 0.5% NaOH from Dupont via Aldrich |
| Aldrich (Milwaukee, WI) P.Q. Corp (Valley Forge, PA) | Fumed Silica, 99.5% $SiO_2$ |

-continued

Materials List silicas

| D | Sodium Silicate, 29% $SiO_2$, 19% NaOH |
| RU | Sodium silicate, 34% $SiO_2$, 18% NaOH |
| K | Sodium Silicate, 32% $SiO_2$, 14% NaOH |
| N | Sodium Silicate, 28% $SiO_2$, 12% NaOH |

Surfactant Templates
Surfactant specifications

The neutral organic amine surfactants include those of the general formula $R_1R_2R_3N$ in which at least one of $R_1$, $R_2$, $R_3$ group is preferably a hydrophobic group. The remainder of the $R_1$, $R_2$, $R_3$ group being selected from various groups.

The neutral organic polyamine surfactants include those of the general formula

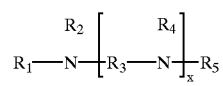

in which at least one of $R_1$ to $R_5$ is preferably a hydrophobic.

$R_1$ is a hydrophobic group preferably containing 6 to 36 carbon atoms;

$R_2$, $R_4$, $R_5$ are alkyl or aryl groups or hydrogen;

$R_3$ is an organic linker group containing one to six carbon atoms; and x is 0 to 6.

Acidified, or protonated amine surfactants include those of the previous general formulas, $R_1R_2R_3N$ and $R_1R_2(NR_3)_x NR_4R_5$, in which an additional proton is temporarily associated with the basic amine creating a labile cationic charge.

Aliphatic and aryl amines including polyamines, most preferably in which one hydrophobic segment contains 6 to 36 carbon atoms. Specific examples include:

| DDA | Dodecylamine, $C_{12}H_{25}NH_2$ from Aldrich |
| | Tallow Amines from Tomah Industries (Milton, WI). |
| TA | Tallow Amine, $C_{14-18}NH_2$ |
| TDA | Tallow Diamine, $C_{14-18}NH(CH_2)_3NH_2$ |
| TTA | Tallow Triamine, $C_{14-18}NH(CH_2)_3NH(CH_2)_3NH_2$ |
| TTeA | Tallow Tetraamine, $C_{14-18}NH(CH_2)_3NH(CH_2)_3NH(CH_2)_3NH_2$ | where $C_{14-18}$ designates the carbon number of the hydrophobic hydrocarbon chain attached to polar amine head group of the surfactant.

Acids

HX where X=Cl, Br, I $H_xY$ where Y=$SO^{2-}_4$, $NO^-_3$, $CO^{2-}_3$, $PO^{3-}_4$ and x equals the charge on Y.

HZ where Z=organic carboxylate, phenolate citrate, glucolate.

EXAMPLE 1

Example 1 demonstrates the ability to form mesoporous silica with stable hybrid lamellar and wormhole framework pore structures from water-soluble silicate and primary amine surfactants. The surfactant solution was prepared by adding 0.58 gram of dodecylamine ($C_{12}H_{25}NH_2$, DDA) to 10 milliliters of $H_2O$. 10 milliliters of 1.0 M acetic acid was added to the surfactant solution and stirred for 10 minutes. A 2.7-gram quantity of sodium silicate (27% $SiO_2$, ~14% NaOH) in 30 milliliters of water was added to the surfactant-acid mixture. The reaction vessel was sealed and stirred at room temperature for 20 hours. The reaction stoichiometry expressed in terms of moles per mole $SiO_2$ corresponded to the following:

0.25 DDA
0.77 NaOH
0.80 $CH_3O_2H$
230 $H_2O$

The resulting solid product was recovered by filtration and calcined at 600° C. for 4 hours in air to remove the incorporated template.

The X-ray diffraction pattern of the calcined product (FIG. 1) exhibited an intense peak at 3.5 nm and a broad shoulder between 4–6 degrees (2θ). The shoulder arises due to scattering from a wormhole pore topology and not from a broadening of higher order Bragg reflections of a long-range ordered material. This characteristic of scattering is not apparent from prior art synthesized mesostructured materials. A value of 3.5 nm was obtained for the average pore-pore correlation distance from the initial XRD peak, signifying a very uniform spatial separation of pores within the oxide matrix. The $N_2$ adsorption-desorption isotherm of the calcined product (FIG. 2) exhibited a step-like $N_2$ adsorption uptake at P/Po 0.15–0.30, and again at P/Po>0.9, indicating capillary condensation within both framework confined mesopores and intra-particle textural pores, respectively.

Figure 2:
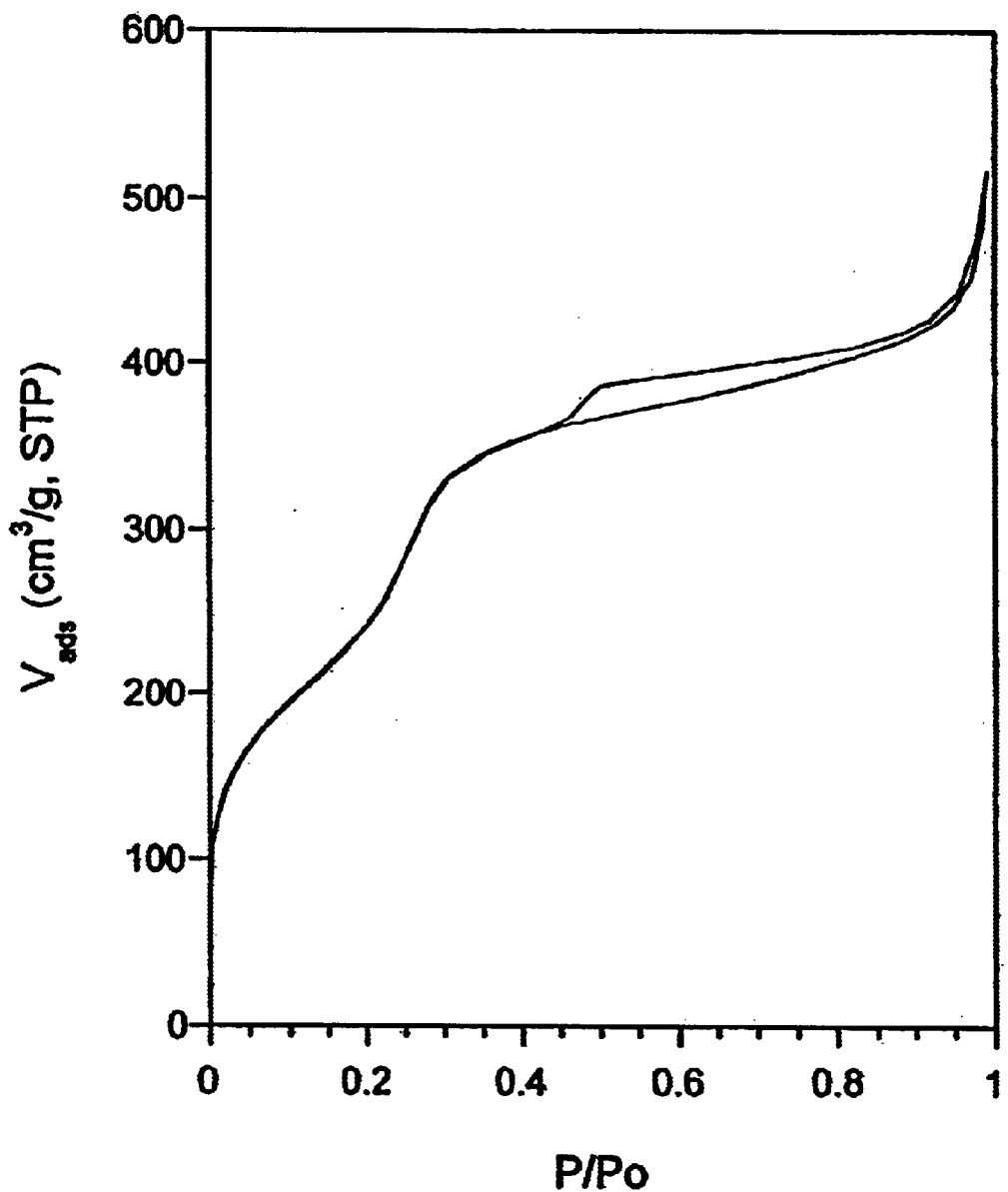
FIG. 2 is a graph showing a N.sub.2 adsorption-desorption isotherm of the calcined product of Example 1.
Figure 3A:
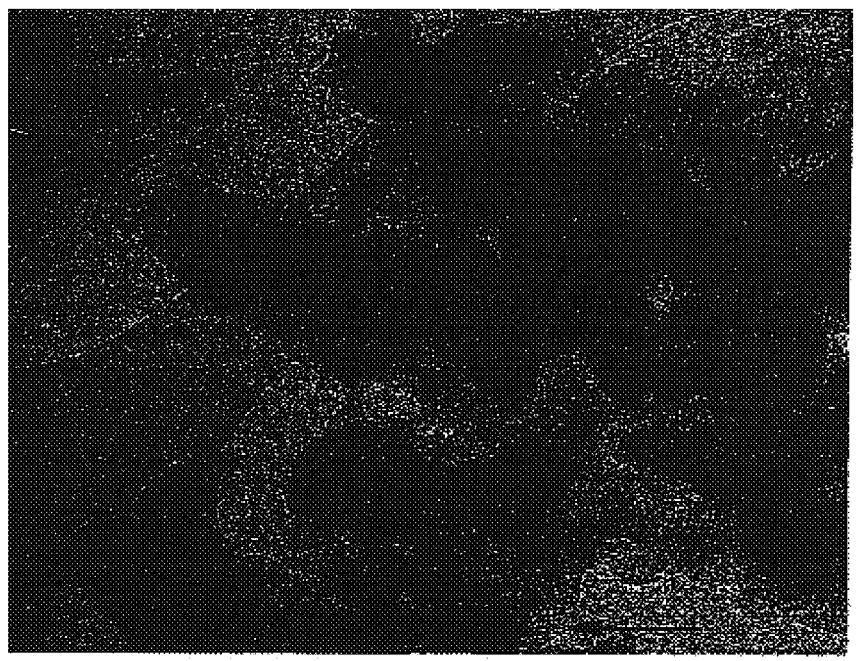
FIGS. 3A and 3B are TEM micrographs of the calcined product of Example 1.
Figure 3B:
Figure 4:
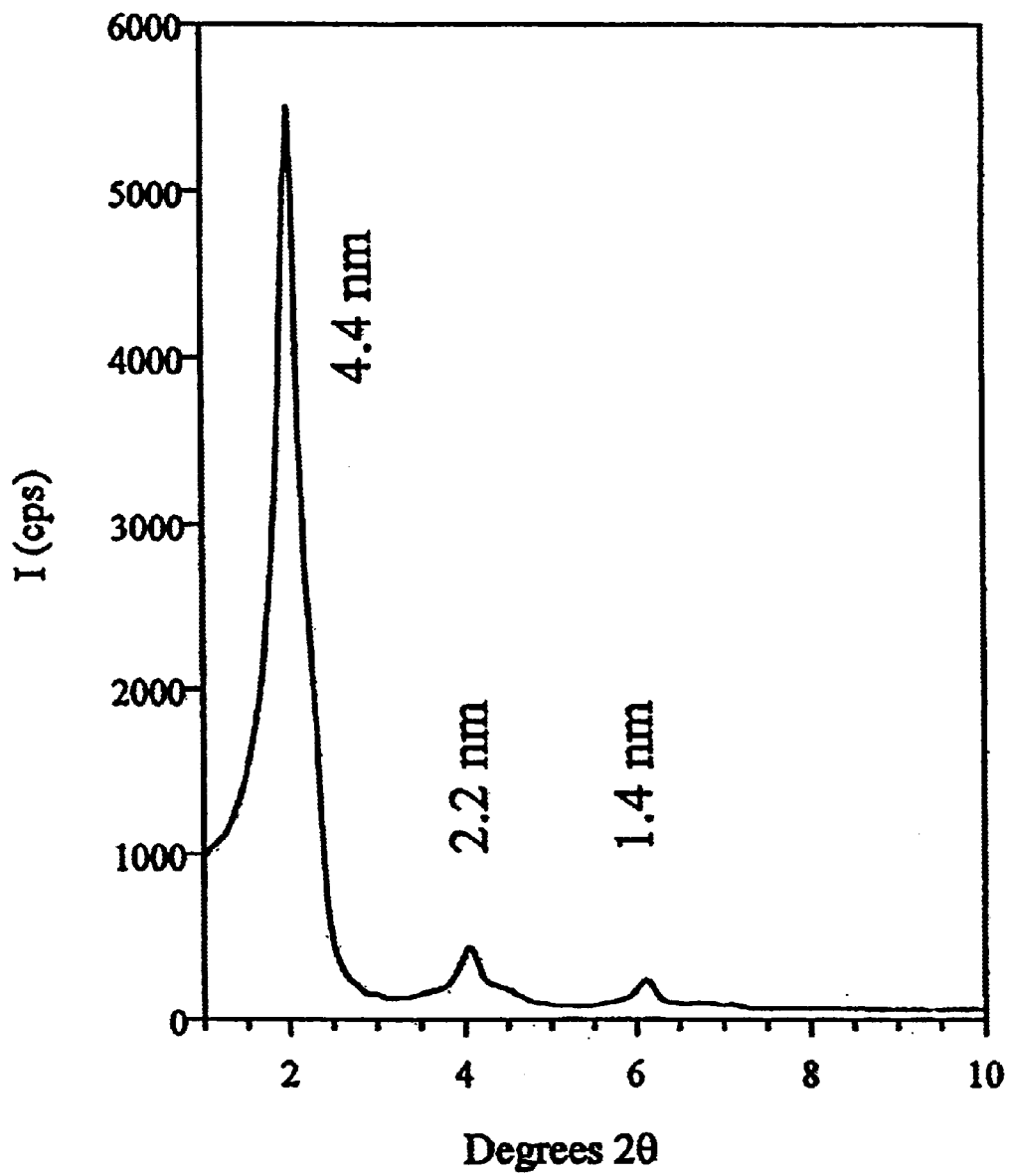
FIG. 4 is an X-ray powder diffraction pattern of the as-synthesized product of Example 2.

TEM images of the calcined product (FIGS. 3A and 3B) show small mesostructured grains. The existence of intra-particle or textural pores as deduced by $N_2$ adsorption is clearly seen in FIG. 4A as the pores formed between the grains of the mesostructured silicas as these grains aggregate and intergrow into a sponge-like particle. Evident within the grains is the disordered mesoporous channel structure and the curved nature of the wormhole channel topology. The uniform pore to pore correlation distance of these wormhole pores as seen in TEM are in agreement of values determined by powder X-ray diffraction (FIG. 1). Additionally, superimposed upon the disordered wormhole framework structure, and observable through TEM imaging, is a distinguishing lamellar structure indicated by arrows in FIGS. 3A and 3B. These molecular sieves with hybrid lamellar and wormhole pore structure are distinct compositions. These compositions are only attainable through the current process using neutral mesostructure assembly of water-soluble silicates by aliphatic amine surfactants.

Comparative Example 2

Example 2 demonstrates the ability to form end member mesoporous silica with a lamellar structure from water-soluble silicate and aliphatic amine surfactants through control of interfacial surfactant-silica interactions. This example reveals the dependence of mesophase formation on H-bonding between surfactant and the neutralized silicate, and the control of this H-bonding by controlling assembly pH. The surfactant solution was prepared by adding 0.58 gram of dodecylamine ($C_{12}H_{25}NH_2$, DDA) to 10 milliliters of $H_2O$. Ten milliliters of 0.25 M acetic acid was added to the surfactant solution and stirred for 10 minutes. A 2.7-g quantity of sodium silicate (27% $SiO_2$, ~14% NaOH) in 30 milliliters of water was added to the surfactant-acid mixture. The reaction mixture at a pH above about 12 was stirred at room temperature for 20 hours in a sealed reaction vessel. The reaction stoichiometry expressed in terms of moles per mole $SiO_2$ corresponded to the following:

0.25 DDA
0.77 NaOH
0.20 $CH_3O_2H$
230 $H_2O$

The resulting solid product was recovered by filtration and calcined at 600° C. for 4 hours in air to remove the incorporated template.

The X-ray diffraction patterns of the as-made product synthesized under high pH conditions (FIG. 4) exhibits a lamellar pattern with $d_{001}$=4.4 nm. Although this structure is not stable to the removal of template and undergoes collapse upon calcination, the end member lamellar structure is clearly identifiable. This example illustrates that the formation of the framework mesophase is directly related to the ability of the reactive silica to H-bond the organic structure director. At high pH values (>10.0) the silicate wall contains significant negative charge. The counter ions needed to match this negative charge interfere in the H-bonding between the inorganic and organic arrays resulting in a mesophase of little or no surface curvature and the resulting lamellar mesophase. This interaction is not apparent from the prior art synthetic strategies. Direct control of the pH of the system, and, therefore indirect control of the H-bonding interactions at the organic-inorganic interface, results in a structure directing interface with a variable surface curvature and, consequently, formation of hybrid structures with variable mesophases unique to this methodology.

EXAMPLES 3–5

The following examples indicate the suitability of long alkyl chain polyamine surfactants as the structure directing surfactant in the synthesis of silicas with hybrid lamellar and wormhole mesophases. Additionally, these surfactants can be combined with low cost mineral or oxy acids for neutralizing the NaOH content of the sodium silicate starting solution.

The following tallow amines were obtained from Tomah Industries:

| | |
|---|---|
| TDA | Tallow Diamine, $C_{14-18}NH(CH_2)_3NH_2$.~MW 298 g/mole |
| TTA | Tallow Triamine, $C_{14-18}NH(CH_2)_3NH(CH_2)_3NH_2$ ~MW 355 g/mole |
| TTeA | Tallow Tetraamine, MW ~412 g/mole $C_{14-18}NH(CH_2)_3NH(CH_2)_3NH(CH_2)_3NH_2$. |

The designation $C_{14-18}$ indicates the carbon number range of the hydrocarbon chain attached to the head group of each surfactant.

An appropriate amount of tallow amine surfactant (see Table 1) was added to 5 ml of EtOH, as a co-surfactant. A 10-ml quantity of 1.0 M HCl was added to the surfactant/EtOH solution while stirring. 25 ml of $H_2O$ was then added to surfactant-acid solution (Solution A). A 2.8-g quantity of sodium silicate (27% $SiO_2$, ~14% NaOH) was added to 10 ml $H_2O$ (Solution B) Solution B was added to solution A dropwise while stirring. The reaction vessel was sealed and stirred at ambient temperature for 20 hours. The reaction stoichiometry expressed in terms of moles per mole $SiO_2$ corresponded to the following:

0.20 moles TDA, TTA, or TteA
198.0 moles $H_2O$
6.80 moles EtOH
0.79 moles HCl
0.79 moles NaOH The resulting solid products were recovered by filtration. The surfactant was removed from mesostructured silica by calcination at 600° C. for 4 hours.

TABLE 1

| Example | Template | Amount of Template (g) | $d_{100}$ | HK | BET |
|---|---|---|---|---|---|
| 3 | TDA | 0.751 | 4.6 | 4.3 | 977 |
| 4 | TTA | 0.845 | 4.6 | 3.7 | 1063 |
| 5 | TTeA | 1.038 | 4.7 | 4.3 | 998 |

The X-ray diffraction pattern of the calcined product of Example 3 (FIG. 5) exhibited an intense peak at 4.6 nm and a broad shoulder between 3–4 degrees (2θ). As in Example 1, the X-ray diffraction pattern indicated a disordered framework pore structure. The significant intensity of both the primary peak and that of the shoulder results from the uniformity of the framework pores. The shoulder arises due to scattering from a wormhole pore topology, and not from a broadening of higher order Bragg reflections of a long-range ordered material. This scattering behavior is not apparent from prior art synthesized mesostructured materials. The $N_2$ adsorption-desorption isotherm of the calcined product of Example 3 (FIG. 6) shows step-like $N_2$ adsorption uptakes at P/Po=0.40–0.50 and >0.9, indicating capillary condensation within framework confined mesopores and intra-particle textural pores, respectively.

TEM images (FIGS. 8A and 8B) confirmed both the disorder of the framework pore channels indicated by powder X-ray diffraction and uniformity of the pore diameters seen in $N_2$ adsorption. In addition, the images show the presence of small grained mesostructured silicas that have aggregated and intergrown into a sponge-like particle with significant intra-particle textural pore volume. Observable in the TEM images is the presence of a wormhole pore topology. As in Example 1, there are areas within the TEM images, FIG. 8A (arrow), which indicate the presence of a lamellar mesostructure. Again, this hybrid lamellar and wormhole structure is unique to the current methodology.

EXAMPLES 6–9

The following examples are chosen to illustrate the use of different silica sources with a wide range of $SiO_2$ to alkali metal ($Na^+$) hydroxide ratios as precursors to mesoporous materials assembled through H-bonding interactions with aliphatic amine surfactant structure directors. With increasing ratio of $SiO_2/Na_2O$, the pH of the silicate source decreases, yet the silicate species increases in polymeric size. The silica sources were provided by P.Q. Corporation (Valley Forge, Pa.) and used according to the grade indicated by the supplier (see Table 2).

TABLE 2

| Example | Silicate Grade | Wt. % $SiO_2$ | $SiO_2/Na_2O$ |
|---|---|---|---|
| 6 | D | 29.5 | 2.06 |
| 7 | RU | 33.7 | 2.51 |
| 8 | K | 32.2 | 3.02 |
| 9 | N | 28.4 | 3.29 |

A 0.750-g quantity of TDA was added to 5 mL of EtOH. Molar quantities of HCl equal to the NaOH content of each silicate solution grade was added to the surfactant solution along with 35 mL of $H_2O$ (Solution A). An appropriate amount of the silicate source (Table 3) was added to 10 mL of $H_2O$ (Solution B). Solution B was added to solution A dropwise while stirring. The reaction stoichiometry expressed in terms of moles per mole $SiO_2$ corresponded to the values given in Table 3.

TABLE 3

| Example | Brand | Mass $SiO_2$ (g) | Stoichiometry/mole $SiO_2$ | | | | |
|---|---|---|---|---|---|---|---|
| | | | TDA | $H_2O$ | EtOH | NaOH | HCl |
| 6 | D | 2.56 | 0.20 | 198 | 6.8 | 0.97 | 0.97 |
| 7 | RU | 2.24 | 0.20 | 198 | 6.8 | 0.79 | 0.79 |
| 8 | K | 2.35 | 0.20 | 198 | 6.8 | 0.66 | 0.66 |
| 9 | N | 2.66 | 0.20 | 198 | 6.8 | 0.61 | 0.61 |

The reaction vessels were sealed and shaken at 240 rpm for 20 hours at 45° C. The products were recovered by filtration, washed and air-dried at ambient temperatures for 24 hours. The products then were calcined at 600° C. for 4 hours in order to remove the incorporated template.

TABLE 4

| Example | $d_{100}$ nm | HK (nm) Pore Size | BET ($m^2/g$) Surface area |
|---|---|---|---|
| 6 | 4.8 | 4.9 | 949 |
| 7 | 4.8 | 4.9 | 916 |
| 8 | 4.7 | 4.8 | 793 |
| 9 | 4.9 | 4.8 | 877 |

Figure 6:
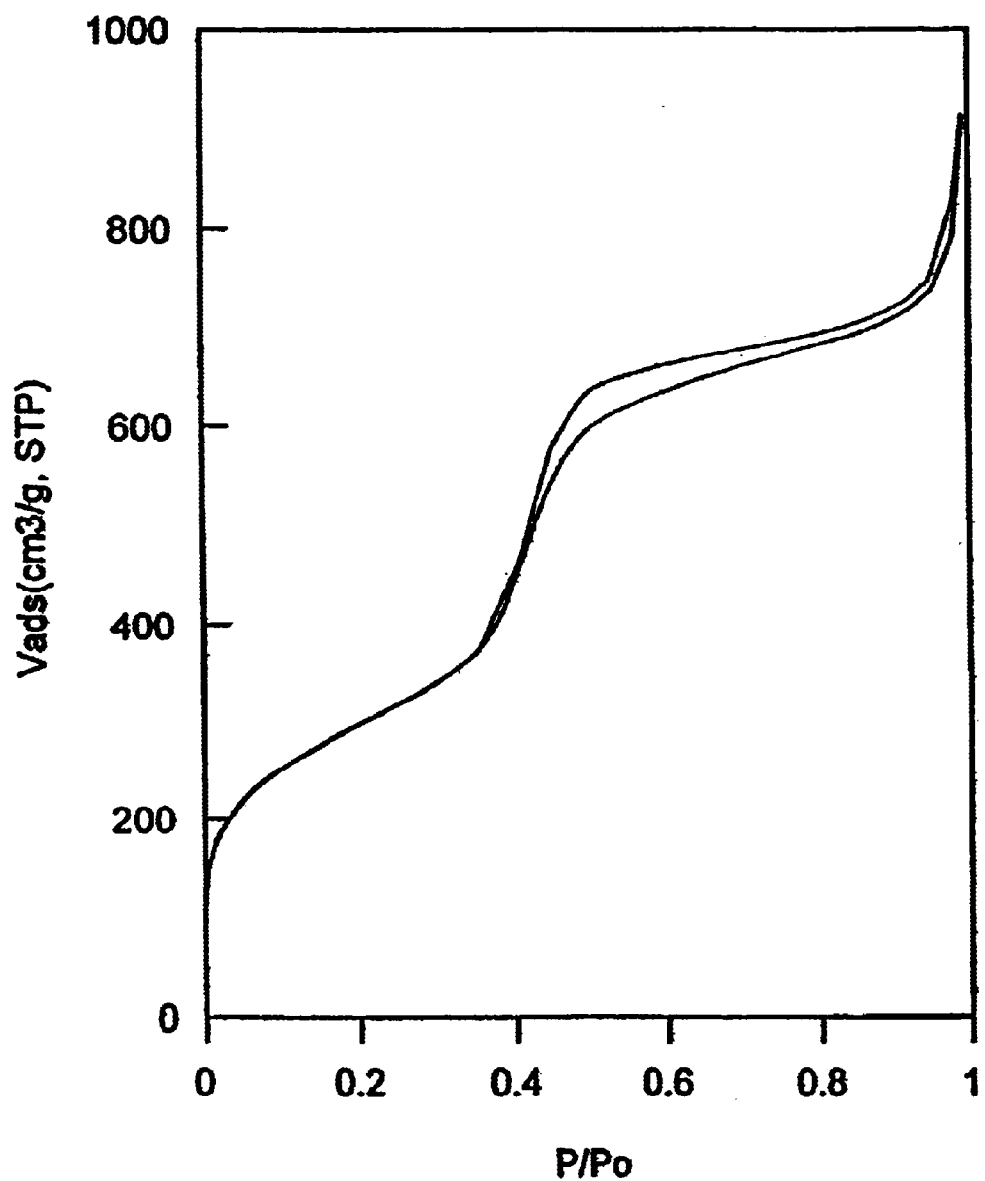
FIG. 6 is a graph showing a N.sub.2 adsorption-desorption isotherm of the calcined product of Example 3.
Figure 7A:
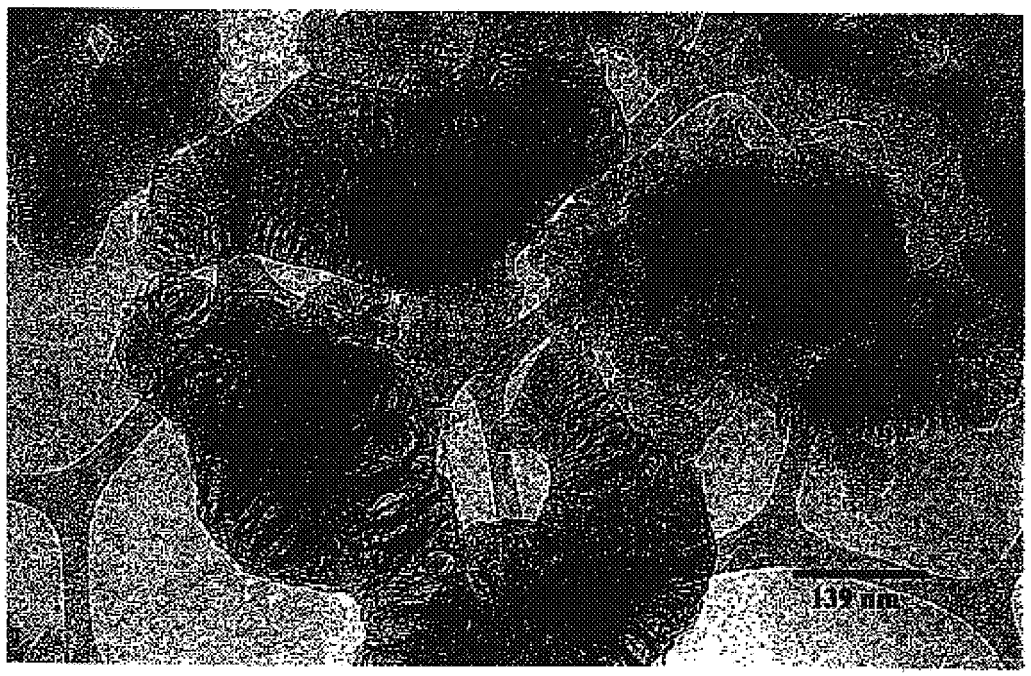
FIGS. 7A and 7B are TEM micrographs of the calcined product of Example 3.
Figure 7B:
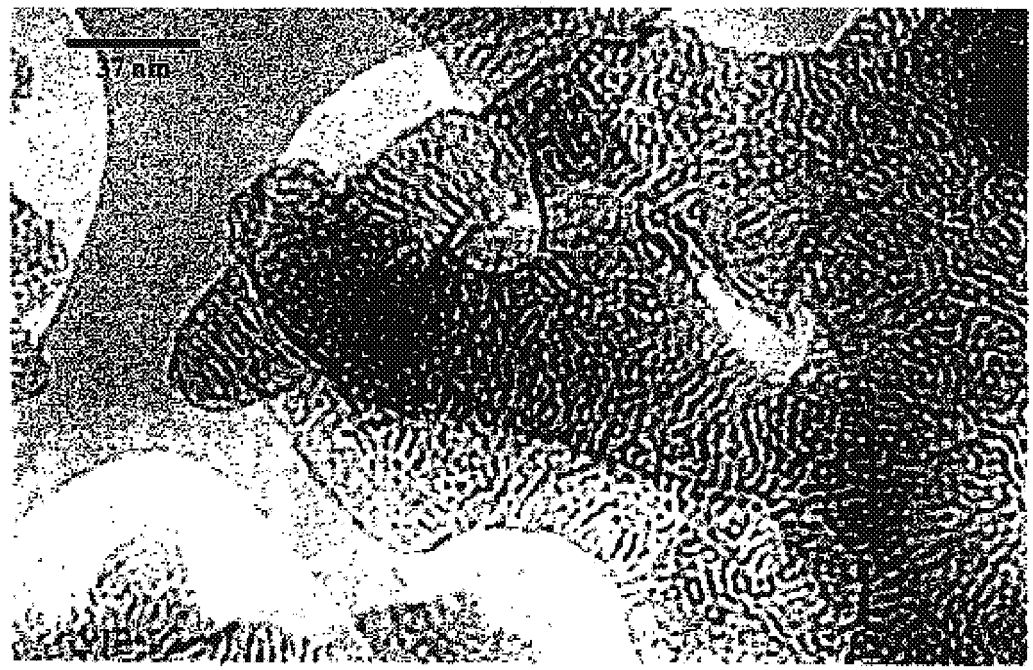

Table 4 lists the physico-chemical properties for Examples 6 to 9. Regardless of the NaOH to $SiO_2$ ratio of the silicate source, the mesopore structure formed by this procedure remained virtually identical to Example 3. In each of the examples, independent of ratio, the structures were very similar in pore diameter, pore to pore spacing and BET surface area. Each sample exhibited powder X-ray diffraction patterns similar to FIG. 5, $N_2$ adsorption desorption isotherms as seen in FIG. 6, and TEM images similar to those in FIG. 7.

With increasing ratio of $SiO_2/Na_2O$, the pH of silicate source decreases, yet the silicate oligomers increase in size. Neutralization of the silicate source with equal molar amounts of acid, regardless of the total hydroxide concentration and oligomeric size, results in a silica that is efficiently structured into a stable hybrid wormhole topology.

EXAMPLES 10 AND 11

Examples 10 and 11 demonstrate the ability to form hybrid lamellar and wormhole mesoporous silica from water-soluble silicate and aliphatic diamine surfactants through control of interfacial interactions. This example reveals the dependence of mesophase formation on H-bonding between surfactant and neutralized silicate and a method of controlling this H-bonding by controlling the assembly temperature. The following examples demonstrate that increasing the assembly temperature increases the framework pore diameter, along with increasing the inorganic crosslinking within the silicate wall structure. This structural behavior is not apparent from prior art and is a characteristic property of the current H-bonding assembly mechanism.

A 0.750-g amount of TDA was added to 5 mL of EtOH. A 10-ml amount of 1.0 M HCl was added to the surfactant/EtOH solution while stirring. 25 ml of $H_2O$ then was added to the solution (Solution A). A 2.8-g amount of sodium silicate (27% $SiO_2$, ~14% NaOH) was added to 10 ml $H_2O$ (solution B). Solution B was added to solution A dropwise while stirring. The reaction stoichiometry expressed in terms of moles per mole $SiO_2$ corresponded to the following:

0.20 moles TDA
   198.0 moles $H_2O$
   6.80 moles EtOH
   0.79 moles HCl
   0.79 moles NaOH The resulting gels were stirred at 45° C. (Example 11) or 65° C. (Example 12) for 20 hours to obtain products. The resulting solid products were recovered by filtration and calcined at 600° C. for 4 hours in air to remove the incorporated template.

TABLE 5

| Example | ° C. | $d_{100}$ | HK pore size | BET surface area | $Q^4/(Q^3 + Q^2)$ |
|---|---|---|---|---|---|
| 3 | Ambient | 4.6 | 4.3 | 1063 | 2.1 |
| 11 | 45° C. | 4.9 | 4.8 | 906 | 3.2 |
| 12 | 65° C. | 5.1 | 5.4 | 754 | 3.8 |

Table 5 lists the physico-chemical properties for Examples 3, 11 and 12. Clearly, increasing the synthesis temperature has a profound affect on the Horvath-Kawazoe (HK) mesopore diameter. As the temperature increases, the pore diameter assembled by the polyamine surfactant systematically increases from approximately 4.3 to 5.4 nm and the surface area decreases from 1063 to 754 $m^2/g$. Also the framework crosslinking parameter $Q^4/(Q^3+Q^2)$ increases with increasing assembly temperature. Each sample exhibits powder X-ray diffraction patterns similar to FIG. 5, $N_2$ adsorption desorption isotherms as seen in FIG. 6 and TEM images similar to those in FIGS. 7A and 7B.

The increasing diameter of the framework pore structure is initiated by a temperature-induced decrease in H-bonding at the interface. The decreasing degree of H-bonding is due to the increased thermal energy at the surfactant-silica interface, combined with the deceasing silanols present at the interface for H-bonding with the amine. Consequently, the decrease in H-bonding results in a decreasing surface curvature of the organic micelle-inorganic interface. Additionally, the deceasing H-bonding between silica and surfactant causes the surfactant micelle to undergo a self-swelling process in which the non-H-bonded surfactant penetrates the core of the micelle. The decreasing surface curvature of the interface combined with the self-swelling of the micelle results in the significant increase in pore diameter with increasing temperature. This structural behavior is not apparent from prior art and is a characteristic property of the current H-bonding assembly mechanism.

As determined by $^{29}Si$ MAS NMR spectroscopy, increasing the synthesis temperature increases the degree on silica condensation, reducing the silanols present in the silica framework and increasing the degree of silica framework cross-linking. The extent of the cross-linking of the silica wall structure is quantified by the ratio of fully cross-linked $Q^4$ silica sites (~–110 ppm) to incompletely cross-linked silica sites ($Q^3$, ~–98 ppm, $Q^2$, ~–90 ppm). As is seen in Table 5, the ratio of $Q^4/(Q^3+Q^2)$ increases 81% from 2.1 to 3.8 with increasing synthesis temperature from ambient (~20° C.) to 65° C.

EXAMPLE 13

The following example is selected to stress the ability to remove the surfactant from the pore structure by a straight-forward solvent extraction. Additionally, simple removal of the surfactant by solvent extraction further confirms the existence of solely H-bonding between the surfactant and silica wall structure.

(Product A) A 0.04-g quantity of the air-dried and non-calcined product of Example 3 was subjected to thermo-gravimetric analysis (TGA) at a heating rate of 5° C./minute. The total weight loss of this sample was approximately 53%. Four distinguishable weight loss steps were centered at temperatures of 40° C., 187° C., 290° C. and 540° C. which could be attributed to the loss of excess $H_2O$, adsorbed pore $H_2O$, desorption or decomposition of template, and de-hydroxylation of the silicate surface, respectively.

(Product B) One gram of the air-dried and non-calcined product of Example 3 was mixed with 100 mL of EtOH and refluxed while stirring for 1 hour. Product was filtered, washed with another portion of EtOH. The above washing procedure was repeated twice and the filtered product was air-dried for 24 hours at ambient temperature. 0.04 grams of product B was subjected to TGA analysis. In contrast to product A, product B reveals only a 17% total weight loss with 14% corresponding to $H_2O$ desorption and de-hydroxylation. Analysis of the two samples shows that more than 85% of the surfactant amine has been removed from the mesostructure with this simple alcohol extraction procedure. The mesostructure retains its x-ray diffraction pattern with relative intensity greater than that of the surfactant occluded sample. This shows that the neutral amine surfactant has been removed from the neutral framework of the inorganic compositions by ethanol extraction. The extracted organic template in the form of EtOH solution can be recycled and reused after simple concentration of the solution. In order to confirm the thermal stability of the extracted product B, calcination was performed in air at 600° C. for 7 hours. The X-ray analysis of the calcined product shows that the correlation distance is retained even after prolonged calcination.

EXAMPLE 14

Mesoporous silica from Example 3 were synthesized to have varying amounts of alkali metal present in the calcined materials. All metal ions can be removed from the product with thorough washing of the material in $H_2O$ as determined from Inductively Coupled Plasma (ICP) analysis.

EXAMPLE 15

The following example uses a polyamine surfactants as the structure directing surfactant in the assembly of a hybrid wormhole and hexagonally ordered molecular sieve silicas. As in previous hybrid structures Examples 1 and 3, the degree of curvature at the organic micelle-inorganic interface is variable and, therefore, controllable through H-bonding interactions unique to the present methodology. The amine surfactant used in preparing these compositions was TTeA Tallow Tetraamine, MW ~412 g/mole $C_{14-18}NH(CH_2)_3NH(CH_2)_3NH(CH_2)_3NH_2$.

A 1.038-g quantity of tallow tetraamine surfactant (TTeA) was added to 5 ml of EtOH. A 12 ml volume of 1.0 M HCl was added to the surfactant/EtOH solution while stirring. 25 ml of $H_2O$ then was added to the surfactant-acid solution (Solution A). 2.8 g of sodium silicate (27% $SiO_2$, ~14% NaOH) was added to 10 ml $H_2O$ (Solution B). Solution B was added to solution A dropwise while stirring, reaction vessel sealed and stirred at 45° C. for 20 hours. The reaction stoichiometry expressed in terms of moles per mole $SiO_2$ corresponded to the following:

0.20 moles TTeA
198.0 moles H$_2$O
6.80 moles EtOH
0.95 moles HCl
0.79 moles NaOH The resulting solid products were recovered by filtration. Surfactant was removed from mesostructured silica by calcination at 600° C. for 4 hours.

TABLE 6

| Example | Template | Amount of Template (g) | $d_{100}$ (nm) | HK (nm) | BET m$^2$/g |
|---------|----------|------------------------|----------------|---------|-------------|
| 15      | TTeA     | 1.038                  | 4.7            | 4.2     | 940         |

Figure 5:
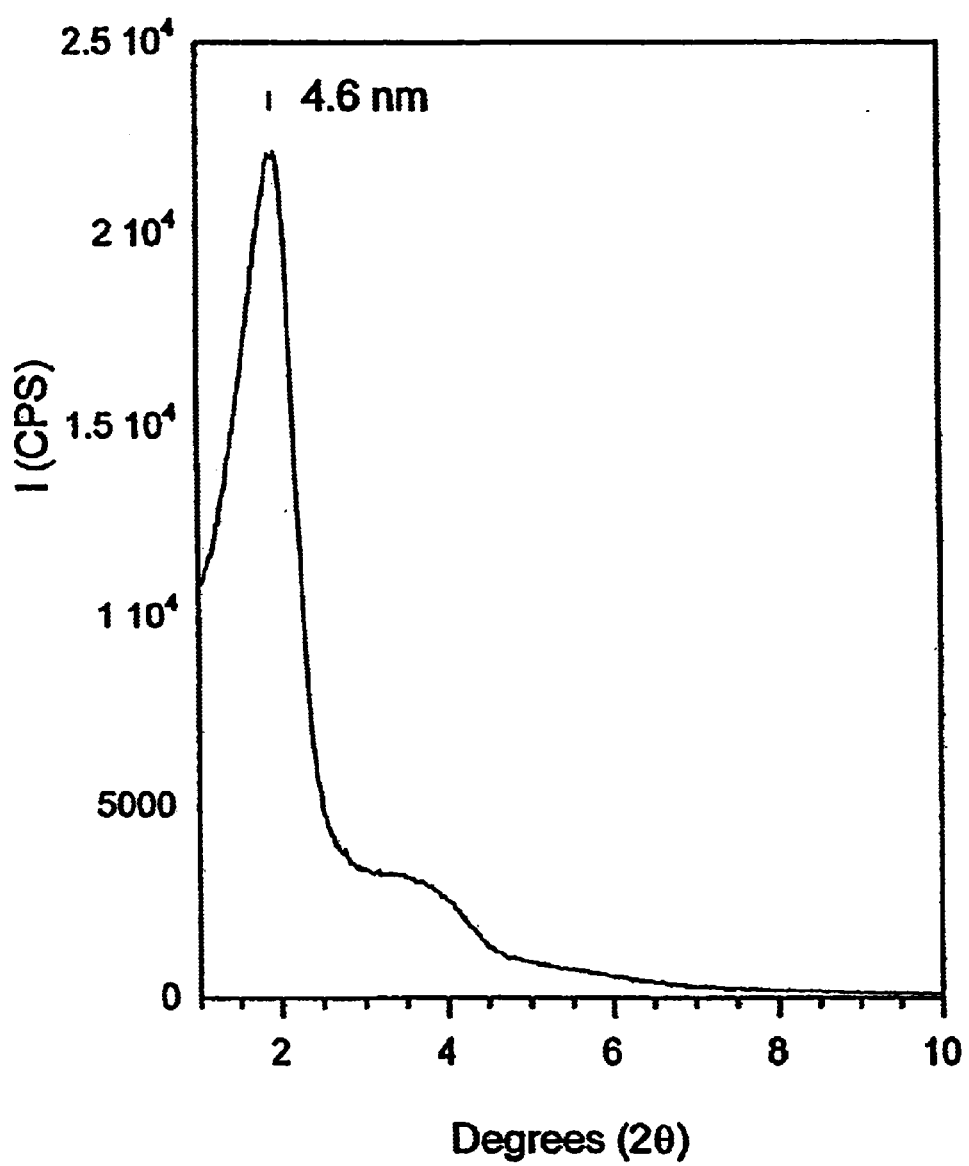
FIG. 5 is an X-ray powder diffraction pattern of the calcined product of Example 3.

The X-ray diffraction pattern of the calcined product of Example 15 exhibited an intense peak at 4.7 nm and a resolved second peak between 3–4 degrees (2θ) (FIG. 5). Unlike Example 5, the resolved second peak in the X-ray diffraction pattern indicates a small domain hexagonally ordered framework pore structure. TEM images (FIGS. 8A and 8B) and selected area electron diffraction (FIG. 10C) confirm the hexagonal order of the pore channels with very small domain sizes. The ordered domains are clearly observed in the TEM images, although there exists a significant fraction of the pore structure resembling a wormhole structure as seen in FIGS. 8A and 8B. There exists no clear phase boundary between the ordered and disordered mesopore phases. The N$_2$ adsorption-desorption isotherm of the calcined product of Example 15 (see FIG. 6, Table 6) shows step-like N$_2$ adsorption uptakes at P/Po=0.40–0.50 and >0.9 indicating capillary condensation within uniform framework confined mesopores and extra-particle textural pores, respectively.

EXAMPLE 16

The following example indicates the ability to directly substitute hetero-atoms, such as aluminum, into the silica framework of these hybrid silica framework mesostructures using basic (pH>7) reagent conditions using a polyamine surfactant as the structure director.

TDA Tallow Diamine, C$_{14-18}$NH(CH$_2$)$_3$NH$_2$, where C$_{14-18}$ indicates the range of carbon atoms in the hydrophobic chain, ~MW 298 g/mole TDA (0.75 g) was added to 5 mL of ethanol. A 10-mL portion of 1.0 M HCl in 25 mL of H$_2$O was then added to yield acidified amine solution (Solution A). A 2.7-g quantity of sodium silicate (27% SiO$_2$, ~14% NaOH, Aldrich) and 0.067 g of NaAlO$_2$.H$_2$O was added to 10 Ml H$_2$O and stirred for 10 min (Solution B). Solution B was added to solution A dropwise while stirring. The reaction vessel was sealed and stirred at ambient temperature for 20 hours. The reaction stoichiometry expressed in terms of moles per mole Si/Al corresponded to the following:

0.20 moles TDA
6.80 moles EtOH
0.79 moles HCl
0.79 moles NaOH
Si/Al=20, SiO$_2$/Al$_2$O$_3$=40

The resulting solid products were recovered by filtration. Surfactant was removed from mesostructured silica by calcination at 600° C. for 4 hours.

The X-ray diffraction pattern of the calcined product of Example 16 was similar to that seen in FIG. 6 and exhibited an intense peak at 4.6 nm and a broad shoulder between 3–4 degrees (2è). As in Example 3, the X-ray diffraction pattern indicated a disordered framework pore structure. The significant intensity of both the primary peak and that of the shoulder results from the uniformity of the pores and their spacing.

The N$_2$ adsorption-desorption isotherm of the calcined product of Example 16 are also similar to those of Example 3 (FIG. 7) and showed N$_2$ adsorption uptakes at P/Po 0.40–0.50 and >0.9 indicating capillary condensation within framework confined mesopores and intra-particle textural pores respectively.

The TEM images were similar to those shown in FIGS. 8A and 8B and confirmed both the disorder of the pore channels indicated by powder X-ray diffraction and the uniformity of the pore diameters seen in N$_2$ adsorption. They also confirmed the presence of small grained mesostructured silicas that aggregate and intergrow into a sponge-like particle with significant intra-particle textural pore volume. Observable in the TEM images was the presence of a wormhole pore topology.

Elemental analysis confirms the Si/Al value equal to 20.

EXAMPLE 17

The following example indicated the ability to directly substitute hetero-atoms, such as aluminum, into the silica framework of these hybrid silica framework mesostructures using acidic (pH<7) reagent conditions and a polyamine surfactant as the structure-directing agent.

TDA Tallow Diamine, C$_{14-18}$NH(CH$_2$)$_3$NH$_2$, where C$_{14-18}$ indicates the range of carbon atoms in the hydrophobic chain, ~MW 298 g/mole TDA (0.75 g) was added to 5 mL of ethanol. A 8-mL quantity of 1.0 M HCl in 25 mL of H$_2$O was then added along with 0.24 g of Al(NO$_3$)$_3$.9H$_2$O to yield an acidified amine/Al$^{+3}$ solution (Solution A). A 2.7-g quantity of sodium silicate (27% SiO$_2$, ~14% NaOH, Aldrich) was added to 10 ml H$_2$O and stirred for 10 minutes (Solution B). Solution B was added to solution A dropwise while stirring. The reaction vessel was sealed and the mixture was stirred at ambient temperature for 20 hours. The reaction stoichiometry expressed in terms of moles per mole Si/Al corresponded to the following:

0.20 moles TDA
198.0 moles H$_2$O
6.80 moles EtOH
0.79 moles HCl
0.79 moles NaOH
Si/Al=20, SiO$_2$/Al$_2$O$_3$=40

The resulting solid products were recovered by filtration. Surfactant was removed from mesostructured alumina-silica by calcination at 600° C. for 4 hours.

The X-ray diffraction pattern of the calcined product of Example 17 is similar to that seen in FIG. 6 and exhibits an intense peak at low angle (2θ) and a broad shoulder at higher angles (2è). As in Example 16, the X-ray diffraction pattern indicates a disordered framework pore structure. The significant intensity of both the primary peak and that of the shoulder results from the uniformity of the pores and their spacing.

The N$_2$ adsorption-desorption isotherm of the calcined product of Example 17 are also similar to those of Example 16 (FIG. 7) and show N$_2$ adsorption uptakes at P/Po 0.40–0.50 and >0.9 indicating capillary condensation within framework confined mesopores and intra-particle textural pores, respectively.

TEM images were similar to those shown in FIGS. 8A and 8B and confirmed both the disorder of the pore channels indicated by powder X-ray diffraction and the uniformity of the pore diameters seen in $N_2$ adsorption. They also confirmed the presence of small grained mesostructured silicas that aggregate and intergrow into a sponge-like particle with significant intra-particle textural pore volume. Observable in the TEM images was the presence of a wormhole pore topology.

Elemental analysis confirmed the Si/Al value was equal to 20.

EXAMPLE 18

The following example demonstrates the ability to neutralize the silicate solution with an acid after mixing the silicate solution with the non-acidified, or protonated, polyamine solution in the assembly of hybrid silica framework mesostructures.

TDA Tallow Diamine, $C_{14-18}NH(CH_2)_3NH_2$, where $C_{14-18}$ indicates the range of carbon atoms in the hydrophobic chain, ~MW 298 g/mole TDA (0.75 g) added to 5 mL of ethanol. A 25-mL volume of $H_2O$ was added to yield amine solution(Solution A). A 2.8-g quantity of sodium silicate (27% $SiO_2$, ~14%NaOH, Aldrich)was added to 10 ml $H_2O$ and stirred for 10 min (Solution B). Solution B was added to solution A dropwise while stirring. A 10-mL volume of 1.0 M HCl was added to the silicate-amine solution with stirring. The reaction vessel was sealed and the reaction mixture was stirred at ambient temperature for 20 hours. The reaction stoichiometry expressed in terms of moles per mole $SiO_2$ correspond to the following:

0.20 moles TDA
198.0 moles $H_2O$
6.80 moles EtOH
0.79 moles HCl
0.79 moles NAOH The resulting solid products were recovered by filtration. The Surfactant was removed from the mesostructured silica by calcination at 600° C. for 4 hours.

The X-ray diffraction pattern of the calcined product of Example 18 was similar to that seen in FIG. 6. As in Example 3, the X-ray diffraction pattern indicated a disordered framework pore structure. The significant intensity of both the primary peak and that of the shoulder resulted from the uniformity of the pores and the spacing of the pores.

The $N_2$ adsorption-desorption isotherms of the calcined product of Example 18 were similar to those of example 3 (FIG. 7) and showed $N_2$ adsorption uptakes at P/Po 0.40–0.50 and >0.9 indicating capillary condensation within framework confined mesopores and intra-particle textural pores, respectively.

The TEM were similar to those seen in FIGS. 8A and 8B and confirmed both the disorder of the pore channels indicated by powder X-ray diffraction and the uniformity of the pore diameters seen in $N_2$ adsorption. They also confirmed the presence of small grained mesostructured silicas that aggregate and intergrow into a sponge-like particle with significant intra-particle textural pore volume. Observable in the TEM images was the presence of a wormhole pore topology.

EXAMPLE 19

The following example are presented to demonstrate the ability to assemble hybrid silica framework mesostructures by initially mixing the silicate and amine solutions at low pH (<4) and then titrating with a base to raise the pH to the preferred value (6.0–8.5)for precipitation of the products.

TDA Tallow Diamine, $C_{14-18}NH(CH_2)_3NH_2$, where $C_{14-18}$ indicates the range of carbon atoms in the hydrophobic chain, ~MW 298 g/mole TDA (0.75 g) was added to 5 mL of ethanol. A 25-mL volume of 1.0 M HCl was then added to yield the acidified amine solution(Solution A). A 2.8-g quantity of sodium silicate (27% $SiO_2$, ~14%NaOH, Aldrich) was added to 10 ml $H_2O$ and stirred for 10 min(Solution B). Solution B was added to solution A dropwise while stirring. 15 mL of 1.0 M NaOH was added to the silicate-amine solution with stirring, yielding a final pH of 6.0–8.5. The reaction vessel was sealed and the mixture was stirred at ambient temperature for 20 hours. The reaction stoichiometry expressed in terms of moles per mole Si/Al corresponded to the following:

0.20 moles TDA
198.0 moles $H_2O$
6.80 moles EtOH
1.98 moles HCl
1.98 moles NaOH The resulting solid products were recovered by filtration. The surfactant was removed from the mesostructured silica by calcination at 600° C. for 4 hours.

The X-ray diffraction pattern of the calcined product of Example 19 was similar to that seen in FIG. 6. As in Example 3, the X-ray diffraction pattern indicated a disordered framework pore structure. The significant intensity of both the primary peak and that of the shoulder resulted from the uniformity of the pores and their spacing.

The $N_2$ adsorption-desorption isotherm of the calcined product of Example 19 were similar to those of example 3 (FIG. 7) and showed $N_2$ adsorption uptakes at P/Po 0.40–0.50 and >0.9 indicative of capillary condensation within framework confined mesopores and intra-particle textural pores respectively.

The TEM images were similar to those seen in FIGS. 8A and 8B and confirmed both the disorder of the pore channels indicated by powder X-ray diffraction and the uniformity of the pore diameters evidenced by $N_2$ adsorption. They also confirmed the presence of small grained mesostructured silicas that aggregate and intergrow into a sponge-like particle with significant intra-particle textural pore volume. Observable in the TEM images was the presence of a wormhole pore topology.

EXAMPLE 20

The following example is presented to demonstrate the ability to substitute an organo-silicate solution for an inorganic sodium silicate solution in the assembly of hybrid silica framework mesostructures.

TDA Tallow Diamine, $C_{14-18}NH(CH_2)_3NH_2$, where $C_{14-18}$ indicates the range of carbon atoms in the hydrophobic chain, ~MW 298 g/mole TMAOH Tetramethylammonium hydroxide A 0.76-g quantity of fumed silica (Cab-O-Sil) was added to 15 mL of $H_2O$ and then 2.76 g of TMAOH was added. The mixture was heated to 40° C. for 72 h (Solution A).

TDA (0.75 g) was added to 5 mL of ethanol. A 25-mL volume of 1.0 M HCl and 5 mL of $H_2O$ was added to yield an acidified amine solution(Solution B). Solution A was added to solution B dropwise while stirring. The reaction vessel was sealed and stirred at ambient temperature for 20 hours. The reaction stoichiometry expressed in terms of moles per mole Si/Al corresponded to the following:

0.20 moles TDA
198.0 moles H$_2$O
6.80 moles EtOH
2.0 moles HCl
2.0 moles TMAOH

The resulting solid products were recovered by filtration. The surfactant was removed from the mesostructured silica by calcination at 600° C. for 4 hours.

The X-ray diffraction pattern of the calcined product of Example 20 were similar to that seen in FIG. 6. As in Example 3, the X-ray diffraction pattern indicated a disordered framework pore structure. The significant intensity of both the primary peak and that of the shoulder results from the uniformity of the pores and their spacing.

The N$_2$ adsorption-desorption isotherm of the calcined product of Example 20 were similar to those of example 3 (FIG. 7) and showed N$_2$ adsorption uptakes at P/Po 0.40–0.50 and >0.9 indicating capillary condensation within framework confined mesopores and intra-particle textural pores respectively.

The TEM images were similar to those seen in FIGS. 8A and 8B and confirmed both the disorder of the pore channels indicated by powder X-ray diffraction and the uniformity of the pore diameters indicated by N$_2$ adsorption. They also confirmed the presence of small grained mesostructured silicas that aggregate and intergrow into a sponge-like particle with significant intra-particle textural pore volume. Observable in the TEM images was the presence of a wormhole pore topology.

It is intended that the foregoing description be only illustrative of the present invention and that the present invention be limited only by the hereinafter appended claims.

We claim:

1. A hybrid mesoporous silica composition comprising a framework structure defining the mesopores which is in one domain lamellar or hexagonal and in another domain with wormhole pores and wherein the domains are intergrown together, wherein the silica is defined in anhydrous form, the silica has the formula:

$$SiM_wO_{2+x}$$

wherein $1.0 \geq w \geq 0$ and $1.5 \geq x \geq 0$ and wherein M when present is one or more metal ions.

2. The composition of claim 1 having at least one resolved X-ray reflection and an X-ray diffraction pattern selected from the group consisting of FIGS. 1, 4 and 5.

3. The composition of claim 1 having a N$_2$ adsorption-desorption isotherm selected from the group consisting of FIGS. 2 and 6.

4. The composition of claim 1 having a BET surface area between 400 and 1400 m$^2$/g.

5. The composition of claim 1 having a textural mesopore volume from 0.01 to 3 cc/g.

6. The composition of claim 1 having TEM micrograph selected from the group consisting of FIGS. 3A, 7A and 8A.

7. The composition of claim 1 wherein the silica contains a hexagonal framework structure.

8. The composition of claim 1 wherein said oxide has a composition as follows:

$$(R-N)_n(SiM_wO_{2+x})$$

wherein (SiM$_w$O$_{2+x}$) is written in anhydrous form without water, wherein R—N is at least one of a selection of neutral aliphatic amines or polyamine surfactants wherein when R—N is present, n is between about 0.05 and 2; wherein when M is present at least one element selected from the group comprising B, Ge, Sb, Zr, W, P, Ba, Y, La, Ce, Sn, Ti, Cr, Nb, Fe, V, Ga, Al, Zn, Co, Ni, Mo and Cu and w and 2+x are the molar stoichiometries of M and "O", respectively, wherein w is 0.00 to 0.30; x is 0.00 to 1.50.

9. The composition of claim 8 having a X-ray diffraction pattern selected from the group consisting of FIG. 4 wherein the main diffraction peak corresponds to a basal spacing between 2.0 and 15 nm.

10. The composition of claim 8 in which the surfactant has been removed from the silica matrix by calcination in air at 600° C.

11. The composition of claim 10 having a N$_2$ adsorption-desorption isotherm, the shape of which is as in FIG. 2.

12. The composition of claim 8 having a TEM micrograph selected from the group consisting of FIGS. 3A, 7A and 8A.

13. The composition of claim 8 in which the surfactant has been removed from silica by solvent extraction or by extraction with an acid.

14. The composition of claim 1 wherein said silica has a composition as follows:

$$(SiM_wO_{2+x})$$

wherein (SiM$_w$O$_{2+x}$) is written in anhydrous form without water, wherein when M is present at least one element selected from the group comprising B, Ge, Sb, Zr, W, P, Ba, Y, La, Ce, Sn, Ti, Cr, Nb, Fe, V, Ga, Al, Zn, Co, Ni, Mo and Cu and w and 2+x are the molar stoichiometries of M and "O", respectively, wherein w is 0.00 to 0.30; x is 0.00 to 1.50.

15. The composition of claim 1 having a X-ray diffraction pattern as in FIG. 1 or FIG. 5.

16. The composition of claim 1 in which the surfactant has been removed from the silica by calcination in air.

17. The composition of claim 16 having a N$_2$ adsorption-desorption isotherm shape as in FIG. 2 or FIG. 6.

18. The composition of claim 16 having a TEM micrograph image selected from the group consisting of FIGS. 3A, 7A and 8A.

19. The composition of claim 16 in which the surfactant has been removed from the silica matrix by solvent extraction or extraction with an acid.

20. The composition of claim 1 wherein said silica has a composition expressed in anhydrous form as follows:

$$E_{n/q}(SiM_wO_{2+x})$$

where E is one or more exchange ions, q is the weighted molar average valence of E; n/q is moles of E per mole of Si, n is the charge on the composition excluding E, and w and 2+x, respectively, are the molar compositions of M and oxygen in the framework, wherein $1.0 \geq w \geq 0$ and $1.5 \geq x \geq 0$.

21. The composition of claim 20 having a X-ray diffraction pattern selected from the group consisting of FIGS. 1 and 5.

22. The composition of claim 20 in which the surfactant has been removed from the silica by calcinations in air.

23. The composition of claim 22 having a N$_2$ adsorption-desorption isotherm shape as in FIG. 6.

24. The composition of claim 22 having a TEM micrograph selected from the group consisting of FIGS. 3A, 7A and 8A.

25. The composition of claim 20 in which the surfactant has been removed from the silica by solvent extraction or by extraction with acid.

26. The composition of claim 27 having a N₂ adsorption-desorption isotherm shape selected from the group consisting of FIG. 6.

27. The composition of claim 1 having a TEM micrograph of FIG. 8A showing ordered pore structures in a hexagonal unit cell within small particle materials and having a selected area electron diffraction pattern showing polycrystalline ordering in the silica as seen by multiple diffraction spots as shown in FIG. 8C.

28. The composition of claim 1 derived from a mixture of a neutral amine, basic silicate and acid in an aqueous solution to produce a pH between about 5 to 10.5.

29. The composition of claim 1 derived from a mixture of a protonated amine and a basic silicate in an aqueous solution to produce a pH between about 5.0 and 10.5.

30. A composition which is a hybrid wormhole and lamellar or hexagonal framework molecular sieve silica prepared by a neutralizing reaction in an aqueous solution of amine surfactant; a reactive silica species of pH between 5.0 and 10.5; aging of the solution to precipitate the silica and removing of the silica from the solution, wherein the silica is defined in anhydrous form, the silica has the formula:

$$SiM_wO_{2+x}$$

wherein $1.0 \geq w \geq 0$ and $1.5 \geq x \geq 0$ and wherein M when present is one or more metal ions.

31. A composition which is a hybrid wormhole and lamellar or hexagonal molecular sieve silica prepared by a process which comprises:
  (a) acidifying an aqueous solution of an amine surfactant as a structure director with an acid selected from the group consisting of organic, mineral and oxy acids;
  (b) preparing a reactive silica species in the aqueous solution by neutralization of a basic soluble silicate solution by mixing with the acidified amine surfactant aqueous solution of step (a) reaching a final pH of about 5 to 10.5;
  (c) aging the reactive silica species from step (b) at a temperature greater than −20° C.;
  (d) recovering a solid product from the aqueous solution by removal of the solution; and
  (e) removing the surfactant from the solid by calcination at 600° C. in air for not less than 30 minutes, by solvent extraction, or by treatment with a stoichiometric amount of aqueous acid solution and washing with water, to produce the molecular sieve silica, wherein silica possesses framework-confined mesopores with pore diameters ranging from 1.0 to 12.0 nm, the framework-confined channel structure comprises a hybrid wormhole and lamellar or hexagonal framework morphology has at least one resolved powder x-ray reflection corresponding to a pore-pore correlation spacing of 1.5 to 15.0 nm, inorganic oxide wall thickness of greater than 0.5 nm, specific surface areas of 400 to 1400 m²/g and framework pore volumes of 0.1 to 3 cc/g N₂.

32. The composition of claim 31 wherein the silica in step (b) is sodium silicate "water glass" with a SiO₂/Na₂O=1.5 to 4.0.

33. The composition of claim 31 wherein silica in step (b) is colloidal silica or fumed silica.

34. The composition of claim 33 wherein soluble silica solution is prepared with addition of an alkali, or organic base to dissolve silica at a high pH greater than 12.

35. The composition of claim 31 wherein said acid is selected from the group consisting of:

HX where X=Cl, Br, I;
$H_xY$ where Y=$NO_3^-$, $SO_4^{-2}$, $PO_4^{-3}$, $CO_3^{-2}$ and x equals the charge on Y; and
HZ, where Z=an organic carboxylate, phenolate, citrate, glycolate.

36. A composition which is a hybrid molecular sieve silica prepared by a process that comprises:
  (a) preparing an aqueous solution of a amine surfactant as an organic structure director;
  (b) adding a basic soluble silicate to the amine solution;
  (c) neutralizing the basic amine and silicate solution with an acid selected from the group consisting of organic, mineral and oxy acids to a final pH of about 5.0 to 10.5 to provide a reactive silica;
  (d) aging reactive silica from step (b) at temperatures greater than −20° C.;
  (e) recovering a solid product from the aqueous solution; and
  (f) removing the surfactant by removal of the solution to provide the molecular sieve silica, wherein the silica possesses framework-confined mesopores with pore diameters ranging from 1.0 to 12.0 nm, the framework-confined channel structure comprises the hybrid of a wormhole and lamellar or wormhole framework morphology, has one resolved powder X-ray reflection corresponding to a pore-pore correlation spacing of 1.5 to 15.0 nm, inorganic oxide wall thickness of greater than 0.5 nm, specific surface areas of 400 to 1400 m²/g and framework pore volumes of 0.2 to 3.0 cc/g N₂.

37. A composition which is a hybrid molecular sieve silica prepared by a process which comprises:
  (a) acidifying an aqueous solution of an amine surfactant containing an alkyl chain with 6 to 36 carbon atoms as the organic structure director with an acid selected from the group consisting of organic, mineral and oxy acids;
  (b) preparing a reactive silica species by addition of a soluble silicate to the acidified amine surfactant reaching a pH of less than 4;
  (c) titrating the reactive silica with a base to a final pH of about 5.0 to 10.5;
  (d) aging reactive silica from step (b) at temperatures greater than −20° C.;
  (e) recovering a solid product from the aqueous solution; and
  (f) removing the surfactant from the solid product to provide the molecular sieve silica, wherein the resulting inorganic oxide possesses framework-confined mesopores with pore diameters ranging from 10 to 12.0 nm, the framework-confined channel structure comprises the hybrid of a wormhole and lamellar or hexagonal framework morphology, has at least one resolved powder x-ray reflection corresponding to a pore-pore correlation spacing of 1.5 to 15.0 nm, inorganic oxide wall thickness of greater than 0.5 nm, specific surface areas of 400 to 1400 m²/g and framework pore volumes of 0.2 to 3.0 cc/g N₂.

38. A process for the preparation of a hybrid wormhole and lamellar or hexagonal molecular sieve silica which comprises:
  (a) reacting in an aqueous solution, an amine surfactant and a reactive silica species of pH between 5.0 and 10.5;
  (b) aging the solution to precipitate the silica; and
  (c) removing the silica from the solution.

39. A process for the preparation of a hybrid molecular sieve silica which comprises:
  (a) providing a protonated amine surfactant solution with a pH below 7.0;
  (b) reacting the protonated amine surfactant solution with a mixture of a base and a soluble silicate solution to produce a reactive silica species at a final pH between about 5.0 and 10.5;
  (c) aging the reactive silica species in the solution of step (b) at a temperature greater than −20° C. to form a precipitated product which is the silica in the solution; and
  (d) recovering the precipitated product from the solution.

40. The process of claim 39 wherein the surfactant is removed from the precipitated product.

41. A process for the preparation of a hybrid molecular sieve silica which comprises:
  (a) acidifying surfactant solution of a neutral amine surfactant with an acid thereof to produce a pH below 7.0;
  (b) forming a reactive silica species by neutralization of a soluble silicate solution with the surfactant solution of step (a) to provide a final pH of about 5.0 to 10.5;
  (c) aging the reactive silica species in the solution of step (b) at a temperature greater than −20° C. to form a precipitated product which is the silica composition in the solution; and
  (d) recovering the precipitated product from the solution.

42. The process of claim 41 wherein soluble silica solution is a sodium silicate with $SiO_2/OH^-$ ratio of between 0.7 and 2.

43. The process of claim 41 wherein the acid is an organic acid.

44. The process of claim 43 wherein the acid is selected from the group consisting of acetic, glycolic, formic and citric acid.

45. The process of claim 41 wherein the surfactant is removed by calcination, solvent extraction or acid washing.

46. The process of claim 41 with the additional step (d) of removing the surfactant and by calcination of the precipitated product in air for not less than 30 minutes.

47. A process for the preparation of a hybrid molecular sieve silica which comprises:
  (a) providing an aqueous solution of a water soluble silicate at a pH greater than 9;
  (b) combining the aqueous solution with a neutral amine surfactant and an acid to produce a resulting mixture wherein the pH of the mixture is between about 5.0 and 10.5;
  (c) aging the resulting mixture at a temperature between −20° and 100° C. until the hybrid molecular sieve silica is formed; and
  (d) removing at least the aqueous solution to produce the hybrid molecular sieve silica.

48. A process for the preparation of a hybrid molecular sieve aluminosilicate which comprises:
  (a) providing an aqueous solution of a water soluble aluminate and silicate in a molar ratio of aluminate to silicate of between about 0.01 and 1.0 at a pH greater than 9;
  (b) combining the aqueous solution with a neutral amine surfactant and an acid in aqueous solution to produce a resulting mixture wherein the pH of the mixture to be between about 5.0 and 10.5;
  (c) aging the resulting mixture at a temperature between −20° and 100° C. until the hybrid molecular sieve aluminosilicate is formed; and
  (d) removing at least the aqueous solution to produce the hybrid molecular sieve aluminosilicate.

49. A process for the preparation of a hybrid molecular sieve aluminosilicate which comprises:
  (a) providing an aqueous solution of a water soluble silicate at a pH greater than 9;
  (b) combining the aqueous solution with a neutral amine surfactant, an aluminum salt and an acid in aqueous solution to produce a resulting mixture wherein the aluminum to silicon molar ratio is between 0.01 and 1.0 and the pH of the mixture to be between about 5.0 and 10.5;
  (c) aging the resulting mixture at a temperature between −20° and 100° C. until the hybrid molecular sieve aluminosilicate is formed; and
  (d) removing at least the aqueous solution to produce the hybrid molecular sieve aluminosilicate.

50. The process of claim 49 wherein in step (d) the surfactant and water are removed from the aluminosilicate so that aluminosilicate is dry.

51. The process of claim 49 wherein the aluminosilicate is calcined.

52. The process of claim 49 wherein the aluminum salt is selected from the group consisting of aluminum nitrate, aluminum chloride, aluminum sulfate and a cationic aluminum oligomer.

* * * * *

UNITED STATES PATENT AND TRADEMARK OFFICE
CERTIFICATE OF CORRECTION

PATENT NO. : 6,800,266 B2
DATED : October 5, 2004
INVENTOR(S) : Thomas J. Pinnavaia, Thomas R. Pauly and Seong-Su Kim It is certified that error appears in the above-identified patent and that said Letters Patent is hereby corrected as shown below:

Column 1,
Line 27, "surfactants surfactants for the" should be -- surfactants, for the --.
Line 62, "areas (-800-1200" should be -- areas (~800-1200 --.

Column 2,
Line 50, "U.S. Patent No. 6,143,879" should be -- U.S. Patent No. 5,143,879 --.

Column 4,
Lines 6-9, "(c) aging the reactive silica species from step (b), prefereably for no less than 5 minutes, at a temperature greater than $-20°C$ in anhydrous form. The silica has the formula:" should be deleted.
Lines 14 and 15, "wherein $1.0 \geq w \geq 0$ and $1.5 \geq x \geq 0$ and wherein M when present is one or more metal ions." should be deleted.

Column 10,
Line 45, "degrees (20) at" should be -- degrees (2θ)at --.

Column 17,
Line 44, "deceasing H-bonding" should be -- decreasing H-bonding --.

Column 19,
Line 20, "degrees (20)" should be -- degrees (2θ) --.

Column 21,
Line 38, "0.79 moles NAOH" should be -- 0.79 moles NaOH --.

UNITED STATES PATENT AND TRADEMARK OFFICE
CERTIFICATE OF CORRECTION

PATENT NO. : 6,800,266 B2
DATED : October 5, 2004
INVENTOR(S) : Thomas J. Pinnavaia, Thomas R. Pauly and Seong-Su Kim It is certified that error appears in the above-identified patent and that said Letters Patent is hereby corrected as shown below:

<u>Column 25,</u>
Line 1, "claim 27" should be -- Claim 20 --.

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,800,266 B2 | Page 1 of 1 |
| APPLICATION NO. | : 09/764686 | |
| DATED | : October 5, 2004 | |
| INVENTOR(S) | : Thomas J. Pinnavaia, Thomas R. Pauly and Seong-Su Kim | |

It is certified that error appears in the above-identified patent and that said Letters Patent is hereby corrected as shown below:

In the Specification:

In column 1, lines 14-16, please delete:

"This invention was sponsored by NSF grant CHE 96-33798 and 99-03706. The government has certain rights in this invention."

and insert:

-- This invention was made with government support under 9633798 and 9903706 awarded by the National Science Foundation. The government has certain rights in the invention. --

Signed and Sealed this
Sixteenth Day of September, 2014

Michelle K. Lee
*Deputy Director of the United States Patent and Trademark Office*